United States Patent [19]

Martin et al.

[11] Patent Number: 5,350,844
[45] Date of Patent: Sep. 27, 1994

[54] PROCESSES FOR THE PREPARATION OF TITANYL PHTHALOCYANINES

[75] Inventors: Trevor I. Martin, Burlington; James D. Mayo, Toronto; Nancy A. Listigovers, Oakville; Cheng K. Hsiao, Mississauga, all of Canada; Terry L. Bluhm, New York, N.Y.; Sharon E. Normandin, Macedon, N.Y.; Kathleen M. Carmichael, Williamson, N.Y.

[73] Assignee: Xerox Corporation, Stamford, Conn.

[21] Appl. No.: 24,145

[22] Filed: Mar. 1, 1993

[51] Int. Cl.5 ............................................. C09B 67/50
[52] U.S. Cl. ...................................... 540/141; 430/78; 540/140; 540/142; 540/143
[58] Field of Search ................ 540/141, 140, 142, 143; 430/78

[56] References Cited

U.S. PATENT DOCUMENTS

| | | | |
|---|---|---|---|
| 5,164,493 | 11/1992 | Mayo et al. | 540/141 |
| 5,166,339 | 11/1992 | Duff et al. | 540/141 |
| 5,182,382 | 1/1993 | Mayo et al. | 540/141 |
| 5,189,155 | 2/1993 | Mayo et al. | 540/141 |

*Primary Examiner*—Mukund J. Shah
*Assistant Examiner*—Pavanaram K. Sripada
*Attorney, Agent, or Firm*—E. O. Palazzo

[57] ABSTRACT

A process for the preparation of a more perfect crystalline form of the Type I polymorph of titanyl phthalocyanine which comprises dissolving a precursor titanyl phthalocyanine Type I in a solution of trihaloacetic acid and alkylene chloride; adding the resultant solution to a solvent thereby enabling precipitation of Type X titanyl phthalocyanine; separating the titanyl phthalocyanine Type X from the solution; followed by a first washing with an organic solvent and a second washing with water; slurrying the resulting Type X titanyl phthalocyanine in an organic solvent enabling conversion of said Type X to Type IV titanyl phthalocyanine; and thereafter, subjecting the Type IV titanyl phthalocyanine obtained to treatment with an organic solvent to enable said crystalline form of titanyl phthalocyanine Type I.

27 Claims, 9 Drawing Sheets

PROCESSES FOR THE PREPARATION OF TITANYL PHTHALOCYANINES

BACKGROUND OF THE INVENTION

This invention is generally directed to titanyl phthalocyanines and processes for the preparation thereof, and more specifically, the present invention is directed to processes for obtaining the Type I polymorph of titanyl phthalocyanine with a more perfect crystalline form, and layered photoconductive members comprised of the aforementioned titanyl phthalocyanine polymorph. The more perfect crystalline structure of the Type I polymorph of titanyl phthalocyanine is differentiated from the less perfect crystalline forms of the same polymorph primarily on the basis of its characteristic X-ray powder diffraction pattern, by its characteristic Raman spectrum and by its enhanced xerographic photosensitivity and stability when compared to a number of the prior art Type I polymorphs of titanyl phthalocyanine. The titanyl phthalocyanine photogenerator pigments with enhanced performance in layered photoconductive members can be obtained by decreasing the level of inherent crystal defects and dislocations in the fundamental crystallite. These defects can be probed and characterized spectroscopically by techniques such as X-ray powder diffraction spectroscopy and Raman spectroscopy. In one embodiment, the process of the present invention comprises the dissolution of a known Type I titanyl phthalocyanine in a trihaloacetic acid and an alkylene halide; reprecipitating the dissolved pigment in a nonsolvent, for example an alcohol or water, or mixtures thereof, to provide Type X titanyl phthalocyanine; separating the Type X titanyl phthalocyanine therefrom; treating the Type X with a halobenzene to obtain a Type IV titanyl phthalocyanine; and subsequently treating by, for example, stirring or milling the Type IV with a dihaloalkane, such as dichloromethane, to form a Type I titanyl phthalocyanine with a more perfect crystal structure as evidenced by X-ray powder diffraction, which crystal structure is different from that of the initial Type I titanyl phthalocyanine precursor. Layered imaging members containing the Type I obtained by the processes of the present invention possess a number of advantages, such as enhanced photoconductivity, reduced dark decay, and very low, for example from about 3 to about 5 percent, cycle down after 50,000 xerographic imaging cycles, together with improved electrical stability. In an embodiment, the process of the present invention comprises the preparation of the precursor Type I polymorph titanyl phthalocyanine by the reaction of titanium tetra(alkoxide) with diiminoisoindolene in a solvent such as chloronaphthalene. Thereafter, the precursor Type I obtained is dissolved in a solvent mixture of trifluoroacetic acid and methylene chloride; and thereafter, the dissolved pigment is precipitated by, for example, adding with stirring the aforementioned mixture to a mixture of methanol and water, separating the product Type X phthalocyanine therefrom by, for example, filtration, slurrying and mixing the product obtained with chlorobenzene to obtain Type IV titanyl phthalocyanine. The Type IV obtained is subsequently treated in slurry form with dichloromethane by, for example, stirring or milling to enable a Type I titanyl phthalocyanine with a lower level of crystalline defects, or a more perfect crystal structure, when compared to the precursor Type I titanyl phthalocyanine. The titanyl phthalocyanine Type I obtained can be selected as an organic photogenerator pigment in photoresponsive imaging members containing charge transport, especially hole transport, layers such as those containing aryl amine hole transport molecules. The aforementioned photoresponsive imaging members can be negatively charged when the photogenerating layer is situated between the hole transport layer and the substrate, or positively charged when the hole transport layer is situated between the photogenerating layer and the supporting substrate. The layered photoconductor imaging members can be selected for a number of different known imaging and printing processes including, for example, electrophotographic imaging processes, especially xerographic imaging and printing processes wherein negatively charged or positively charged images are rendered visible with toner compositions of the appropriate charge. Generally, the imaging members are sensitive in the wavelength regions of from about 600 to about 850 nanometers, thus inexpensive solid state diode lasers can be selected as the light source.

Many processes for the preparation of titanyl phthalocyanines are known, such as the sulfuric acid pasting methods, reference for example EPO publication 314,100. In the aforementioned Mita EPO Patent Publication 314,100, there is illustrated the synthesis of titanyl phthalocyanine, see for example pages 5 and 6, by, for example, the reaction of titanium alkoxides and diiminoisoindolene in quinoline or an alkylbenzene, and the subsequent conversion thereof to an alpha Type pigment (Type II) by an acid pasting process, whereby the synthesized pigment is dissolved in concentrated sulfuric acid, and the resultant solution is poured onto ice to precipitate the alpha-form, which is filtered and washed with methylene chloride. This pigment, which was blended with varying amounts of metal free phthalocyanine, could be selected as the electric charge generating layer in layered photoresponsive imaging members with a high photosensitivity at, for example, 780 nanometers.

In Japanese 62-256865, there is disclosed, for example, a process for the preparation of pure Type I involving the addition of titanium tetrachloride to a solution of phthalonitrile in an organic solvent which has been heated in advance to a temperature of from 160° to 300° C. In Japanese 62-256866, there is illustrated, for example, a method of preparing the aforementioned polymorph which involves the rapid heating of a mixture of phthalonitrile and titanium tetrachloride in an organic solvent at a temperature of from 100° to 170° C. over a time period which does not exceed one hour. In Japanese 62-256867, there is described, for example, a process for the preparation of pure Type II (B) titanyl phthalocyanine, which involves a similar method to the latter except that the time to heat the mixture at from 100° to 170° C. is maintained for at least two and one half hours. Types I and II, in the pure form obtained by the process of the above publications, apparently afforded layered photoresponsive imaging members with excellent electrophotographic characteristics. Also, as mentioned in the textbook *Phthalocyanine Compounds* by Moser and Thomas, the disclosure of which is totally incorporated herein by reference, polymorphism or the ability to form distinct solid state forms is well known in phthalocyanines. For example, metal-free phthalocyanine is known to exist in at least 5 forms designated as alpha, beta, pi, X and tau. Copper phthalocyanine crystal forms known as alpha, beta, gamma, delta, epsilon and pi are also described. These different polymorphic forms are usually distinguishable on the basis of differences in the solid state properties of the materials, which can be determined by measurements, such as Differential Scanning Calorimetry, Infrared Spectroscopy, Ultraviolet-Visible-Near Infrared spectroscopy and, especially, X-ray Powder Diffraction techniques. There appears to be general agreement on the nomenclature used to designate specific polymorphs of commonly used pigments such as metal-free and copper phthalocyanine. However, this does not appear to be the situation with titanyl phthalocyanines as different nomenclature is selected in a number of instances. For example, reference is made to alpha, beta, A, B, C, y, and m forms of TiOPc (titanyl phthalocyanine) with different names being used for the same form in some situations. It is believed that five main crystal forms of TiOPc are known, that is Types X, I, II, III, and IV.

TABLE 1

| Crystal Form | Other Names | Documents |
|---|---|---|
| Type I | β | Toyo Ink Electrophotog. (Japan) 27, 533 (1988) |
|  | β | Dainippon U.S. Pat. No. 4,728,592 |
|  | β | Sanyo-Shikiso JOP 63-20365 |
|  | A | Mitsubishi JOP 62-25685, -6, -7 Conference Proceedings |
|  | A | Konica "Japan Hardcopy 1989", 103, (1989) |
| Type II | α | Toyo Ink "Electrophoto (Japan)" 27, 533 (1988) |
|  | α | Sanyo-Shikiso JOP 63-20365 |
|  | α | Konica U.S. Pat. No. 4,898,799 |
|  | α | Dainippon U.S. Pat. No. 4,728,592 |
|  | α | Mita EU 314,100 |
|  | B | Mitsubishi JOP 62-25685, -6, -7 |
|  | B | Konica "Japan Hardcopy 1989, 103, (1989) |
| Type III | C | Mitsubishi OP 62-25685, -6, -7 |
|  | C | Konica "Japan Hardcopy 1989, 103, (1989) |
|  | m | Toyo Ink "Electrophoto (Japan)" 27, 533 (1988) |
| Type IV | y | Konica "Japan Hardcopy 1989", 103, (1989) |
|  | Unnamed | Konica U.S. Pat. No. 4,898,799 |
|  | New Type | Sanyo-Shikiso JOP 63-20365 |

The aforementioned documents illustrate, for example, the use of specific polymorphs of titanyl phthalocyanine in electrophotographic devices.

In U.S. Pat. No. 4,664,997, there is illustrated a process for the preparation of the Type I polymorph of titanyl phthalocyanine, wherein the polymorph produced exhibits peaks in the X-ray powder diffraction pattern at Bragg angles (2 theta) between 4 and 8 degrees that are stipulated to be less than 5 percent of the intensity of the diffraction peak at Bragg angle 26.3 degrees. A lengthy process is described, for example columns 8 and 9, wherein titanyl phthalocyanine of the Type I polymorph is prepared by the reaction of titanium tetrachloride with phthalonitrile at 200° C. in chloronaphthalene as a solvent. The crude product obtained is purified extensively by washing with first, chloronaphthalene, then methanol, and hot water. The resultant pigment is then suspended, filtered, and resuspended in hot N-methyl pyrrolidone for 5 consecutive slurries, followed by extensive further washings with methanol. This procedure appears to provide a method for purification of Type I titanyl phthalocyanine by removing small amounts of a contaminant Type II titanyl phthalocyanine present in the crude Type I titanyl phthalocyanine. This is evident from a consideration of the X-ray diffraction patterns depicted in FIGS. 5, 6, and 7 of U.S. Pat. No. 4,664,997, which show the presence of small amounts of Type II titanyl phthalocyanine, as evidenced by the small peak at Bragg angle (2 theta) at 7.5 degrees. It is the removal of this contaminant Type II titanyl phthalocyanine, which apparently leads to the improved electrophotographic performance depicted in Table I of U.S. Pat. No. 4,664,997, as a result of the improved washing procedures as described in Preparation Examples 1, 2, 3, and 4 of the aforementioned U.S. Pat. No. 4,664,997. No evidence is provided in U.S. Pat. No. 4,664,997 that indicates that a more perfect crystalline form of the Type I polymorph of titanyl phthalocyanine had been prepared. The X-ray powder diffraction pattern for the preferred embodiment, depicted in FIG. 1 of this patent, does not show the small peak at Bragg angle 6.8°; nor does it show the dramatically enhanced intensity of the peaks at Bragg angle (2 theta) at 9.2°, 10.4°, 13.1°, 15.0°, 15.6°, and 16.0°, relative to the most intense peak at 26.2°; neither does it show the resolved peak at 26.5° as claimed in the present invention. Compare, for example, FIG. 1 of U.S. Pat. No. 4,664,997 and FIG. 1 of the present invention.

In Sanyo-Shikiso Japanese 63-20365/86, reference is made to the known crystal forms alpha and beta TiOPc (Types II and I, respectively, it is believed), which publication also describes a process for the preparation of a new form of titanyl phthalocyanine. This publication appears to suggest the use of the unnamed titanyl phthalocyanine as a pigment and its use as a recording medium for optical discs. This apparently new form was prepared by treating acid pasted TiOPc (Type II form, it is believed) with a mixture of chlorobenzene and water at about 50° C. The resulting apparently new form is distinguished on the basis of its XRPD, which appears to be identical to that shown in FIG. 3 for the Type IV polymorph.

In U.S. Pat. No. 4,728,592, there is illustrated, for example, the use of alpha type TiOPc (Type II) in an electrophotographic device having sensitivity over a broad wavelength range of from 500 to 900 nanometers. This form was prepared by the treatment of dichlorotitanium phthalocyanine with concentrated aqueous ammonia and pyridine at reflux for 1 hour. Also described in the aforementioned patent is a beta Type TiOPc (Type I) as a pigment, which is believed to provide a much poorer quality photoreceptor.

In Konica Japanese 64-17066/89, there is disclosed, for example, the use of a new crystal modification of TiOPc prepared from alpha type pigment (Type II) by milling it in a sand mill with salt and polyethylene glycol. This pigment had a strong XRPD peak at a Bragg Angle (2 theta) value of 27.3 degrees. This publication also discloses that this new form differs from alpha type pigment (Type II) in its light absorption and shows a maximum absorbance at 817 nanometers compared to alpha type, which has a maximum at 830 nanometers. The XRPD shown in the publication for this new form is believed to be identical to that of the Type IV form previously described by Sanyo-Shikiso in JOP 63-20365. The aforementioned Konica publication also discloses the use of this new form of TiOPc in a layered electrophotographic device having high sensitivity to near infrared light of 780 nanometers. The new form is indicated to be superior in this application to alpha type TiOPc (Type II). Further, this new form is also described in U.S. Pat. No. 4,898,799 and in a paper presented at the Annual Conference of Japan Hardcopy in July 1989. In this paper, this same new form is referred to as Type y, and reference is also made to Types I, II, and III as A, B, and C, respectively.

In the journal, *Electrophotography* (Japan) vol. 27, pages 533 to 538, Toyo Ink Manufacturing Company, there are disclosed, for example, alpha and beta forms of TiOPc (Types II and I, respectively, it is believed) and also this journal discloses the preparation of a Type M TiOPc, an apparently new form having an XRPD pattern which was distinct from other crystal forms. It is believed that this XRPD is similar to that for the Type III titanyl phthalocyanine pigment but it is broadened most likely as the particle size is much smaller than that usually found in the Type III pigment.

Processes for the preparation of specific polymorphs of titanyl phthalocyanine, which require the use of a strong acid such as sulfuric acid, are known, and these processes, it is believed, are not easily scalable. One process as illustrated in Konica Japanese Laid Open on Jan. 20, 1989 as 64-17066 (U.S. Pat. No. 4,643,770 appears to be its equivalent), the disclosure of which is totally incorporated herein by reference, involves, for example, the reaction of titanium tetrachloride and phthalonitrile in 1-chloronaphthalene solvent to produce dichlorotitanium phthalocyanine which is then subjected to hydrolysis by ammonia water to enable the Type II polymorph. This phthalocyanine is preferably treated with an electron releasing solvent, such as 2-ethoxyethanol, dioxane, or N-methylpyrrolidone, followed by subjecting the alpha-titanyl phthalocyanine to milling at a temperature of from 50° to 180° C. In a second method described in the aforementioned Japanese Publication, there is disclosed the preparation of alpha type titanyl phthalocyanine with sulfuric acid. Another method for the preparation of Type IV titanyl phthalocyanine involves the addition of an aromatic hydrocarbon, such as chlorobenzene solvent, to an aqueous suspension of Type II titanyl phthalocyanine prepared by the well known acid pasting process, and heating the resultant suspension to about 50° C. as disclosed in Sanyo-Shikiso Japanese 63-20365, Laid Open in Jan. 28, 1988. In Japanese 171771/1986, Laid Open Aug. 2, 1986, there is disclosed the purification of metallophthalocyanine by treatment with N-methylpyrrolidone.

To obtain a titanyl phthalocyanine based photoreceptor having high sensitivity to near infrared light, it is believed necessary to control not only the purity and chemical structure of the pigment, as is generally the situation with organic photoconductors, but also to prepare the pigment in the preferred crystal modification. The disclosed processes used to prepare specific crystal forms of TiOPc, such as Types I, II, III and IV, are either complicated and difficult to control, as in the preparation of pure Types I and II pigment by careful control of the synthesis parameters by the processes described in Mitsubishi Japanese 62-25685, -6 and -7; involve harsh treatment such as sand milling at high temperature, reference Konica U.S. Pat. No. 4,898,799; or dissolution of the pigment in a large volume of concentrated sulfuric acid, a solvent which is known to cause decomposition of metal phthalocyanines, reference Sanyo-Shikiso Japanese 63-20365 and Mita EPO 314,100.

Generally, layered photoresponsive imaging members are described in a number of U.S. patents, such as U.S. Pat. No. 4,265,900, the disclosure of which is totally incorporated herein by reference, wherein there is illustrated an imaging member comprised of a photogenerating layer and an aryl amine hole transport layer. Examples of photogenerating layer components include trigonal selenium, metal phthalocyanines, vanadyl phthalocyanines, and metal free phthalocyanines. Additionally, there is described in U.S. Pat. No. 3,121,006 a composite xerographic photoconductive member comprised of finely divided particles of a photoconductive inorganic compound dispersed in an electrically insulating organic resin binder. The binder materials disclosed in the '006 patent comprise a material which is incapable of transporting for any significant distance injected charge carriers generated by the photoconductive particles.

In a copending application U.S. Ser. No. 537,714 (D/90087), the disclosure of which is totally incorporated herein by reference, there are illustrated photoresponsive imaging members with photogenerating titanyl phthalocyanine layers prepared by vacuum deposition. It is indicated in this copending application that the imaging members comprised of the vacuum deposited titanyl phthalocyanines and aryl amine hole transporting compounds exhibit superior xerographic performance as low dark decay characteristics result and higher photosensitivity is generated, particularly in comparison to several prior art imaging members prepared by solution coating or spray coating, reference for example U.S. Pat. No. 4,429,029 mentioned hereinbefore.

In U.S. Pat. No. 5,153,313 (D/90244), the disclosure of which is totally incorporated herein by reference, there is illustrated a process for the preparation of phthalocyanine composites which comprises adding a metal free phthalocyanine, a metal phthalocyanine, a metalloxy phthalocyanine or mixtures thereof to a solution of trifluoroacetic acid and a monohaloalkane; adding to the resulting mixture a titanyl phthalocyanine; adding the resulting solution to a mixture that will enable precipitation of said composite; and recovering the phthalocyanine composite precipitated product.

In U.S. Pat. No. 5,166,339 (D/90198), the disclosure of which is totally incorporated herein by reference, there is illustrated a process for the preparation of titanyl phthalocyanine Type I, Type II, Type III, Type IV, Type X, Type Z-1, and Type Z-2, which consists essentially of dissolving a titanyl phthalocyanine in a solution of trifluoroacetic acid and methylene chloride; adding the resultant solution to a solvent or solvent mixture that will enable precipitation; and separating the product titanyl phthalocyanine from the solution followed by an optional washing; and in U.S. Pat. No. 5,164,493 (D/90524), the disclosure of which is totally incorporated herein by reference, there is illustrated a process for the preparation of titanyl phthalocyanine Type I consisting essentially of the addition of titanium tetraalkoxide to a mixture of phthalonitrile and a diiminoisoindoline to a solvent of N-methylpyrrolidone, chloronaphthalene, chlorobenzene, or quinoline, followed by heating, and wherein the alkoxide contains from 1 to about 6 carbon atoms.

In U.S. Pat. No. 5,206,359 there is disclosed a process for the preparation of titanyl phthalocyanine which comprises the treatment of titanyl phthalocyanine Type X with a halobenzene; U.S. Pat. No. 5,189,156 discloses a process for the preparation of titanyl phthalocyanine which comprises the reaction of a titanium tetraalkoxide and diiminoisoindolene in the presence of a halonaphthalene solvent; dissolving the resulting Type I titanyl phthalocyanine in a haloacetic acid and an alkylene halide; adding the resulting mixture slowly to a cold alcohol solution; and thereafter isolating the resulting Type X titanyl phthalocyanine; slurrying the resultant Type X titanyl phthalocyanine in a halobenzene solvent, such as chlorobenzene, to give Type IV titanyl phthalocyanine with an average volume particle size diameter of from about 0.01 to about 0.1 micron; U.S. Pat. No. 5,189,155 discloses a process for the preparation of titanyl phthalocyanine Type I which comprises the reaction of titanium tetraalkoxide and diiminoisoindolene in the presence of a halonaphthalene solvent; and U.S. Pat. No. 5,182,382 illustrates processes for the preparation of titanyl phthalocyanines and photoresponsive imaging members thereof. More specifically, in one embodiment of this copending application there are provided processes for the preparation of titanyl phthalocyanine (TiOPc) Type X polymorphs which comprises the solubilization of a titanyl phthalocyanine Type I, which can be obtained by the reaction of diiminoisoindoline and titanium tetrabutoxide in the presence of a solvent, such as chloronaphthalene, reference U.S. Pat. No. 5,189,156, the disclosure of which is totally incorporated herein by reference, in a mixture of trifluoroacetic acid and methylene chloride, precipitation of the desired titanyl phthalocyanine Type X, separation by, for example, filtration, and thereafter subjecting the product to slurrying in fluorobenzene to provide Type X TiOPc exhibiting xerographic characteristics which are superior to those of the Type X formed prior to the fluorobenzene treatment. The product can be identified by various known means including X-ray powder diffraction (XRPD).

The disclosures of each of the aforementioned patents are totally incorporated herein by reference.

SUMMARY OF THE INVENTION

It is an object of the present invention to provide processes for the preparation of titanyl phthalocyanines with many of the advantages illustrated herein.

It is yet another object of the present invention to provide economically scalable processes for the preparation of Type I titanyl phthalocyanines with a more perfect crystal structure having Bragg angles (2$\Theta$) at 6.8, 9.2, 10.4, 12.3, 13.1, 15.0, 15.6, 16.0, 20.6, 23.2, 25.3, 26.2, 26.5, and 27.1 degrees (all $\pm 0.2°$), as determined by XRPD analysis, reference FIG. 1.

Another object of the present invention relates to the preparation of stable novel titanyl phthalocyanine Type I polymorphs.

Moreover, another object of the present invention relates to the preparation of stable titanyl phthalocyanine Type I with high purity, for example exceeding about 99 percent, and the use thereof in electrophotographic imaging processes.

Yet another object of the present invention is the provision of processes that affords a more perfect Type I crystal form of TiOPc with improved photosensitivity and other advantages when selected as a photogenerator in a layered imaging member.

Another object of the present invention in an embodiment thereof resides in the preparation of TiOPc Type I polymorphs possessing a small particle diameter size of about 0.1 micron, which is advantageous for the preparation of electrophotographic devices since, for example, the prepared polymorphs can be easily dispersed in coating compositions.

Yet another object of the present invention is the provision of processes for the preparation of Type I titanyl phthalocyanine having an X-ray powder diffraction pattern which is substantially different from the precursor Type I from which it originated, as evidenced from the X-ray powder diffraction patterns shown, for example, in FIGS. 1 and 2, respectively.

Yet another object of the present invention is the provision of processes for the preparation of Type I titanyl phthalocyanine with an FT-raman spectrum which is substantially different from the Type I precursor from which it originated, reference for example FIGS. 5 and 6.

Yet another object of the present invention is the provision of processes for the preparation of Type I titanyl phthalocyanine with a UV absorption spectrum which is substantially different from the Type I precursor from which it originated, reference for example FIGS. 7 and 8.

Further, in another object of the present invention there are provided processes for the preparation of Type I titanyl phthalocyanine that has improved xerographic electrical characteristics as compared to the Type I precursor from which it originated.

A further object of the present invention resides in the provision of photoresponsive imaging members with an aryl amine hole transport layer, and a photogenerator layer comprised of titanyl phthalocyanine pigment Type I obtained by the processes illustrated herein.

In embodiments, the present invention relates to processes for the preparation of titanyl phthalocyanines and photoresponsive imaging members thereof. More specifically, in one embodiment of the present invention there are provided processes for the preparation of titanyl phthalocyanine (TiOPc) Type I polymorphs which comprise the solubilization of a precursor titanyl phthalocyanine Type I, which can be obtained by the reaction of diiminoisoindoline and titanium tetrabutoxide in the presence of a solvent, such as chloronaphthalene, reference U.S. Pat. No. 5,189,156, the disclosure of which is totally incorporated herein by reference, in a mixture of a trihaloacetic acid, such as trifluoroacetic acid and an alkylene halide such as methylene chloride, precipitation of the desired titanyl phthalocyanine Type X, separation by, for example, filtration, and thereafter subjecting the product to a slurry treatment with a halobenzene, like chlorobenzene; and subsequently subjecting the resulting Type IV titanyl phthalocyanine to treatment with a solvent, like dichloromethane slurry, to provide a more perfect crystal form of Type I titanyl phthalocyanine. The product can be identified by various known means including X-ray powder diffraction analysis (XRPD) and Raman spectroscopy.

One embodiment of the present invention is directed to processes for the preparation of a more perfect crystal form of titanyl phthalocyanine Type I, as determined by X-ray powder diffraction, which comprises dissolving a precursor titanyl phthalocyanine Type I in a mixture of trifluoroacetic acid and methylene chloride; adding the resulting mixture to a stirred organic solvent, such as an aliphatic alcohol, with from about 1 to about 12 carbon atoms like methanol, ethanol, propanol, butanol, and the like, water or mixtures thereof; separating the resulting precipitate of Type X by, for example, vacuum filtration through a glass fiber paper in a Buchner funnel; forming a slurry of the obtained Type X pigment with chlorobenzene to enable the conversion to the Type IV polymorph, and subsequently milling or stirring the slurry of the Type IV pigment in a suitable organic solvent, for example methylene chloride, ethylene chloride, and the like; and isolating therefrom the desired Type I titanyl phthalocyanine having less crystalline defects, when compared to the precursor Type I titanyl phthalocyanine.

In embodiments, the present invention is directed to a process for the preparation of titanyl phthalocyanine Type I with Bragg angle (2Θ) at 6.8, 9.2, 10.4, 12.3, 13.1, 15.0, 15.6, 16.0, 20.6, 23.2, 25.3, 26.2, 26.5, and 27.1 degrees (±0.2 degrees), which comprises the reaction of a titanium alkoxide with diiminoisoindoline in a solvent of chloronaphthalene; dissolving the obtained precursor Type I titanyl phthalocyanine in a solvent comprised of trifluoroacetic acid and methylene chloride; reprecipitating the dissolved pigment by addition to a suitable nonsolvent comprised of methanol and water; subsequently washing the Type X titanyl phthalocyanine obtained with first methanol then water; converting the Type X to Type IV by slurrying the Type X in monochlorobenzene; forming a slurry of the formed Type IV in methylene chloride; and isolating the said Type I titanyl phthalocyanine; and also a process wherein the X-ray diffraction pattern of the more perfect crystalline form of the Type I titanyl phthalocyanine polymorph has a peak at a Bragg angle (2Θ) of 6.8° (±0.2°); a peak at 9.2° (±0.2°), having an intensity of at least 80 percent relative to the major peak in the trace at 26.2°; a peak at 10.4° (±0.2°), which is of intensity of at least 50 percent relative to the major peak in the trace at 26.2° 2Θ; a peak at 13.1° (±0.2°), which is of intensity at least 60 percent relative to the major peak in the trace at 26.2°; a peak at 15.0° (±0.2°), which is of intensity of at least 40 percent relative to the major peak in the trace at 26.2°; a peak at 15.6° (±0.2°), which is of intensity at least 25 percent relative to the major peak in the trace at 26.2°; a peak at 16.0° (±0.2°), which is of intensity at least 25 percent relative to the major peak in the trace at 26.2°; a peak at 20.6° (±0.2°), which is of intensity at least 25 percent relative to the major peak in the trace at 26.2°; a resolved peak at 26.5° (±0.2°), which is of intensity at least 10 percent relative to the major peak in the trace at 26.2°; and a peak at 27.1° (±0.2°), which is of intensity at least 20 percent relative to the major peak in the trace at 26.2°. Examples of titanyl phthalocyanine reactants that can be selected for the processes of the present invention in effective amounts of, for example, from about 1 weight percent to about 40 percent by weight and preferably about 10 percent of the weight of the trihalo, especially trifluoroacetic acid solvent mixture, include known available titanyl phthalocyanines; titanyl phthalocyanines synthesized from the reaction of titanium halides such as titanium trichloride, titanium tetrachloride or tetrabromide; titanium tetraalkoxides such as titanium tetra-methoxide, -ethoxide, -propoxide, -butoxide, -isopropoxide and the like; and other titanium salts. These materials can be reacted with, for example, phthalonitrile and diiminoisoindolene in solvents such as 1-chloronaphthalene, quinoline, N-methylpyrrolidone, such that the solids contained in the reaction range in an amount of from about 5 percent to abut 40 percent and preferably about 20 percent and alkylbenzenes such as xylene at temperatures of from about 120° to about 300° C. to provide the precursor Type I titanyl phthalocyanine.

As the solvent mixture for the Type I titanyl phthalocyanine, obtained as illustrated herein or obtained from other sources, there can be selected a strong organic acid, such as trihaloacetic acids, including trifluoroacetic acid or trichloroacetic acid, and a cosolvent, such as an alkylene halide, wherein alkylene contains, for example, from 1 to about 12 carbon atoms, such as methylene and ethylene chloride, chloroform, trichloroethylene, bromoform, similar short chain halogenated alkanes and alkenes with from 1 to about 6 carbon atoms and from 1 to about 6 halogen atoms including chlorofluorocarbons and hydrochlorofluorocarbons; haloaromatic compounds such as chlorobenzene, dichlorobenzene, chloronaphthalene, fluorobenzene, bromobenzene, and benzene; alkylbenzenes such as toluene and xylene; and other organic solvents which are miscible with strong organic acids, and which will effectively dissolve the titanyl phthalocyanine, in effective amounts of, for example, a ratio of from about 1 to 50 parts of acid to about 50 parts of cosolvent such as methylene chloride. In an embodiment of the present invention, a preferred solvent mixture is comprised of trifluoroacetic acid and methylene chloride in a ratio of from about 5 parts of acid to about 95 parts of methylene chloride to 25 parts of acid to 75 parts of methylene chloride.

Subsequent to solubilization with the above solvent mixture and stirring for an effective period of time of, for example, from about 5 minutes to about 24 hours, the resulting mixture is added to a suitable solvent in an amount of from about 1 volume part to about 100 volume parts and preferably about 10 volume parts per part of acid that is used to dissolve the pigment, which solvent is comprised of an aliphatic alcohol with from about 1 to about 12 carbon atoms, such as methanol, ethanol, propanol, isopropanol, butanol, n-butanol, pentanol and the like; water and mixtures thereof; followed by filtration of the titanyl phthalocyanine polymorph Type X, and washing with various solvents such as, for example, deionized water and an alcohol such as methanol, ethanol, and the like, which serves to remove residual acid and any impurities which might have been released by the process of dissolving and reprecipitating the pigment. The solid resulting can then be dried by, for example, heating, yielding a dark blue pigment of the desired titanyl phthalocyanine Type X polymorph, as determined by XRPD analysis. The Type X obtained is then treated by mixing with a halobenzene, like chlorobenzene, to enable the polymorphic conversion to Type IV titanyl phthalocyanine; and thereafter the Type IV is slurried with dichloromethane or tetrahydrofuran, and the stable product Type I with excellent photosensitivity separated therefrom by, for example, filtration.

In an embodiment of the present invention, there is provided a process for the preparation of the more perfect crystal form of the Type I polymorph of titanyl phthalocyanine with the XRPD of FIG. 1 and the Raman spectrum of FIG. 5, which comprises (1) dissolving the precursor pigment, Type I titanyl phthalocyanine, reference FIG. 2, in a mixture of trifluoroacetic acid and methylene chloride comprised of from 5 percent of acid to about 25 percent of acid and 95 parts to 75 parts of methylene chloride, wherein the amount of precursor pigment is, for example, from 5 parts to about 25 parts of the precursor pigment to 100 parts of acid solution by adding the pigment to the solution and stirring the mixture for an effective period of time, for example from about 5 minutes to about 24 hours, and in an embodiment about 15 minutes, at a temperature of from about 0° to about 50° C.; (2) pouring or adding the resultant solution into a rapidly stirred precipitant solvent in a ratio of from about 1 part of the aforementioned pigment solution to 2 parts of precipitant solution to about 1 part pigment solution to about 50 parts of precipitant at a temperature of from about 0° to about 100° C. over a period of from 1 minute to about 60 minutes to ensure rapid efficient mixing. In an embodiment, the precipitant solution was stirred at a rate sufficient to form a deep vortex in the reaction vessel, and the pigment solution was poured in a slow stream into the side of the vortex; (3) following the addition, the resultant dispersion of the polymorphic form Type X of titanyl phthalocyanine was stirred at a temperature of from 0° to about 100° C. for a period of from about 5 minutes to about 24 hours; (4) subsequently separating the titanyl phthalocyanine Type X from the mother liquor by filtration, for example through a glass fiber filter in a porcelain filter funnel, and washing the product titanyl phthalocyanine Type X pigment in the funnel with an effective amount of solvent, for example from about 20 parts of wash solvent to about 1 part of the starting pigment, such as methanol, to remove most of the acidic mother liquor; (5) redispersing the resulting wet cake in a solvent, such as methanol, acetone, water, and the like in an effective amount of, for example, from about 20 parts to about 100 parts of solvent to 1 part of the pigment for a period of from about 5 minutes to 24 hours at a temperature of from 0° C. to about 100° C., the primary purpose of such washing being to further remove any residual acid or other impurities from the Type X TiOPc which resulted from the precipitation process; (6) isolating the desired titanyl phthalocyanine polymorph Type X by, for example, filtration through a glass fiber filter as in step (4); (7) contacting the Type X obtained with chlorobenzene to form Type IV titanyl phthalocyanine; and (8) subsequently slurrying the Type IV obtained with dichloromethane. The aforementioned slurry is formed by addition of, for example, from about 10 milliliters to about 2,000 milliliters, and preferably from about 100 milliliters to about 500 milliliters, and most preferably about 200 milliliters of dichloromethane to 10 grams of powdered Type IV TiOPc contained in a suitably sized glass receptacle. The mixture was stirred by, for example, a magnetic stirring bar at room temperature, from about 20° C. to about 27° C., and preferably about 24° C., for a period of from about 24 hours to about 7 days, and preferably about 30 hours to about 72 hours, and, in a preferred embodiment, about 50 hours, when complete conversion of the Type IV polymorph to the Type I polymorph results, as evidenced by monitoring the polymorphic conversion by X-ray powder diffraction analysis. The treated pigment was isolated by, for example, filtration through a glass microfiber filter, and oven dried in air at a temperature of 50° C. for a period of 4 hours. X-ray powder diffraction analysis of the resulting pigment provided a pattern substantially different from the Type I precursor material, reference for example the FIGS. 1 and 2 presented herein.

In another embodiment of the present invention, the aforementioned obtained Type IV titanyl phthalocyanine is converted to a crystalline form of Type I, which is more perfect than the Type I precursor material by addition of, for example, from about 5 milliliters to about 1,000 milliliters, and preferably from about 50 milliliters to about 250 milliliters, and most preferably about 100 milliliters of dichloromethane to 5 grams of powdered Type IV TiOPc in a suitably sized glass jar containing about 800 grams of ⅛ inch stainless steel balls. The mixture was ball milled at approximately 250 RPM (revolutions per minute) at an external temperature of from about 20° C. to about 27° C., and preferably about 24° C., for a period of from about 5 minutes to about 50 hours, and preferably about 3 hours, and until complete conversion of the Type IV polymorph to the Type I polymorph results, as evidenced by monitoring the conversion by X-ray powder diffraction analysis. The treated pigment was isolated by, for example, filtration through a glass microfiber filter, and oven dried in air at a temperature of 50° C. for a period of 4 hours. X-ray powder diffraction analysis of the resulting pigment gave a pattern substantially different from the Type I precursor material, as demonstrated by a comparison of the X-ray diffraction patterns in FIGS. 1 and 2.

The Type I obtained, such as the more perfect crystal form of the Type I titanyl phthalocyanine, possesses excellent xerographic characteristics when fabricated into suitable electrophotographic layered imaging members, for example an $E_{\frac{1}{2}}$ equal to 2.1 ergs/cm$^2$, a dark decay of 7 to 9 volts/second, and a percent discharge at 5 and 10 ergs/cm$^2$ (incident light at 780 nanometers) of 79 and 90 percent, respectively, when the aforementioned Type I was selected as a photogenerator in a layered imaging member, such as that described in FIG. 9. The final product can be obtained after the solid has been dried at a temperature of from about 25° to about 150° C. for a time of 1 hour to about 24 hours, for example either in the air or under vacuum. A yield corresponding to about 95 percent to about 75 percent of the weight of the starting pigment can be obtained. The polymorphic form of the pigment product was determined by XRPD analysis and Raman spectroscopy, and it was determined that a more perfect crystal form of Type I had been prepared, and that it remained in this form of Type I after three months, as determined by XRPD analysis. One important characteristic associated with imaging members containing the more perfect crystal form of Type I titanyl phthalocyanines obtained with the processes of the present invention include a low, 3 to 5 percent cycle down of the dark decay potential after 50,000 imaging cycles, as compared to the precursor Type I titanyl phthalocyanine, which exhibits cycle down of the dark decay potential of 20 to 40 percent, and compared to some commercial electrophotographic imaging members incorporating Type I titanyl phthalocyanine which typically exhibit over 10 percent cycle down of the dark decay potential after 50,000 imaging cycles, and an $E_{\frac{1}{2}}$ of about 4.6 ergs/cm$^2$ at 780 nanometers.

A typical small scale conversion reaction was accomplished in an embodiment of the present invention as follows:

Two grams of precursor titanyl phthalocyanine Type I synthesized by the process of Example I, below, was dissolved in 20 milliliters of a 1:4 mixture (V/V) of trifluoroacetic acid in methylene chloride by stirring in a 25 milliliter Erlenmeyer flask at room temperature for 5 minutes. The resultant dark green solution, which did not contain any undissolved material, was then poured into 200 milliliters of a vigorously stirred mixture of 1:1 methanol and water in a 250 milliliter Erlenmeyer flask at room temperature. The resultant dark blue suspension was stirred at room temperature for an additional 30 minutes and then was filtered through a 4.25 centimeter glass fiber filter (Whatman GF/A grade) and the solid was washed on the funnel with about 20 milliliters of methanol. The resultant wet filter cake was transferred to a 125 milliliter flask and was redispersed in 50 milliliters of methanol. The resulting dispersion was stirred for 30 minutes, then was refiltered as above, and the resultant solid was washed on the funnel with methanol (20 milliliters), then water (2×20 milliliters), and finally with methanol again (20 milliliters). Subsequently, the Type X titanyl phthalocyanine obtained was then slurried in chlorobenzene for a period of about 1 hour at room temperature, and the Type IV separated therefrom by, for example, filtration. The solid was dried at 70° C. for 2 hours to yield about 1.9 grams of dark blue pigment. The product was identified as Type IV TiOPc on the basis of its XRPD trace (reference FIG. 3 for XRDP of Type IV). Thereafter, the aforementioned Type IV was slurried in 100 milliliters of dichloromethane for about 50 hours by magnetic stirring at a controlled temperature of about 24° C. The solid product was separated therefrom by filtration to yield the more perfect crystal form of titanyl phthalocyanine Type I.

Numerous different layered photoresponsive imaging members can be fabricated with the phthalocyanine pigments obtained by the processes of the present invention. In one embodiment, the layered photoresponsive imaging members can be comprised of a supporting substrate, a charge transport layer, especially an aryl amine hole transport layer, and situated therebetween a photogenerator layer comprised of titanyl phthalocyanine of the more perfect crystal form of Type I. Another embodiment of the present invention is directed to positively charged layered photoresponsive imaging members comprised of a supporting substrate, a charge transport layer, especially an aryl amine hole transport layer, and as a top overcoating titanyl phthalocyanine pigments of the Type I polymorph obtained with the processes of the present invention. Moreover, there is provided in accordance with the present invention an improved negatively charged photoresponsive imaging member comprised of a supporting substrate, a thin adhesive layer, a titanyl phthalocyanine of the Type I polymorph obtained by the processes of the present invention, dispersed in a polymeric binder, and as a top layer aryl amine hole transporting molecules dispersed in a polymeric binder.

The photoresponsive imaging members of the present invention can be prepared by a number of known methods, the process parameters and the order of coating of the layers being dependent on the member desired. The imaging members suitable for positive charging can be prepared by reversing the order of deposition of photogenerator and hole transport layers. The photogenerating and charge transport layers of the imaging members can be coated as solutions or dispersions onto selective substrates by the use of a spray coater, dip coater, extrusion coater, roller coater, wire-bar coater, slot coater, doctor blade coater, gravure coater, and the like, and dried at from 40° to about 200° C. for from 10 minutes to several hours under stationary conditions or in an air flow. The coating is carried out in such a manner that the final coating thickness is from 0.01 to about 30 microns after it has dried. The fabrication conditions for a given layer will be tailored to achieve optimum performance and cost in the final device.

Imaging members with the titanyl phthalocyanine pigments of the present invention are useful in various electrostatographic imaging and printing systems, particularly those conventionally known as xerographic processes. Specifically, the imaging members of the present invention are useful in xerographic imaging processes wherein the titanyl phthalocyanines pigments absorb light of a wavelength of from about 600 nanometers to about 900 nanometers. In these known processes, electrostatic latent images are initially formed on the imaging member followed by development, and thereafter transferring the toned image to a suitable substrate.

Moreover, the imaging members of the present invention can be selected for electronic printing processes with gallium arsenide laser diode arrays which typically function at wavelengths of from 600 to about 850 nanometers.

BRIEF DESCRIPTION OF THE DRAWINGS

For a better understanding of the present invention and further features thereof, reference is made to the following detailed description of various preferred embodiments wherein.

DESCRIPTION OF EMBODIMENTS

Figure 9:
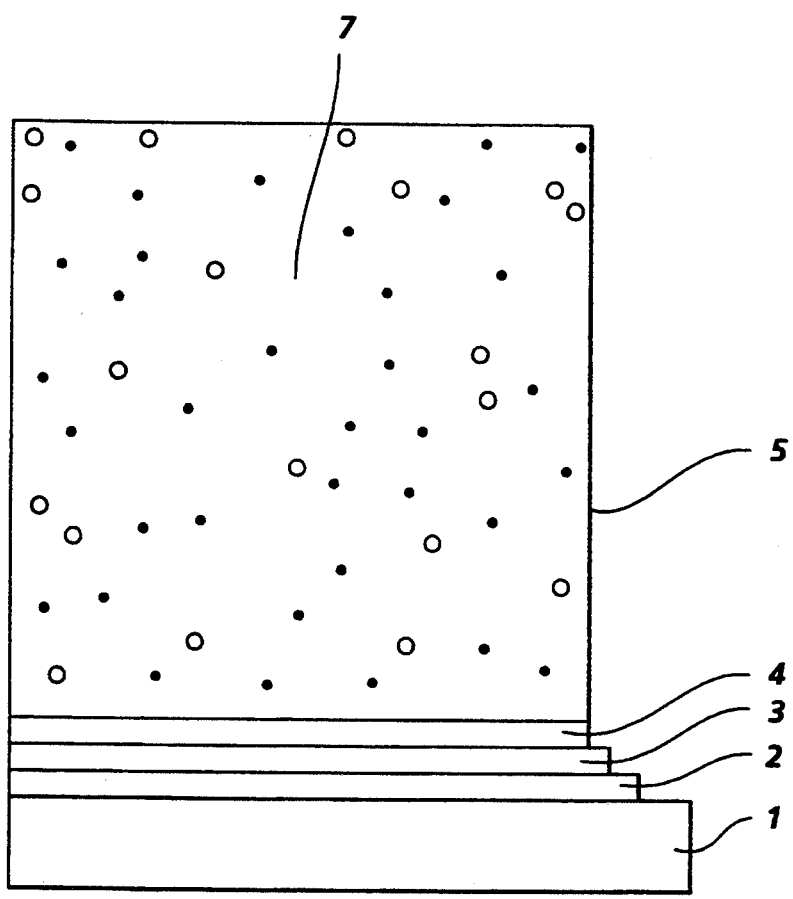
FIG. 9 illustrates an imaging member with the titanyl phthalocyanines obtained with the processes of the present invention.

Illustrated in FIG. 9 is a negatively charged photoresponsive imaging member of the present invention comprised of a supporting substrate 1, a solution coated hole blocking layer 2 comprised, for example, of a polysilane, an optional adhesive layer 3, for example polyester 49,000 available from Goodyear Chemical, a photogenerator layer 4 comprised of titanyl phthalocyanine Type I, obtained with the process of the present invention, optionally dispersed in a polymeric binder, and a charge transport layer 5 comprised of N,N'-diphenyl-N,N'-bis(3-methyl phenyl)-1,1'-biphenyl-4,4'-diamine dispersed in a polycarbonate host resin 7. This member has the electrical characteristics as shown in Table 1.

Substrate layers selected for the imaging members of the present invention can be opaque or substantially transparent, and may comprise any suitable material having the requisite mechanical properties. Thus, the substrate may comprise a layer of insulating material including inorganic or organic polymeric materials, such as MYLAR ®, a commercially available polymer, a layer of an organic or inorganic material having a semiconductive surface layer such as indium tin oxide or aluminum arranged thereon, or a conductive material inclusive of aluminum, chromium, nickel, titanium, zirconium, brass or the like. The substrate may be flexible, seamless, or rigid and may have a number of many different configurations, such as for example a plate, a cylindrical drum, a scroll, an endless flexible belt and the like. In one embodiment, the substrate is in the form of a seamless flexible belt. In some situations, it may be desirable to coat on the back of the substrate, particularly when the substrate is a flexible organic polymeric material, an anticurl layer, such as for example polycarbonate materials commercially available as MAKROLON ®.

The thickness of the substrate layer depends on many factors, including economical considerations, thus this layer may be of substantial thickness, for example over 3,000 microns, or of minimum thickness providing there are no adverse effects on the system. In one embodiment, the thickness of this layer is from about 75 microns to about 300 microns.

With further regard to the imaging members, the photogenerator layer is comprised of the titanyl phthalocyanine pigments Type I obtained with the processes of the present invention dispersed in resinous binders. Generally, the thickness of the photogenerator layer depends on a number of factors, including the thicknesses of the other layers and the amount of photogenerator material contained in this layer. Accordingly, this layer can be of a thickness of from about 0.05 micron to about 10 microns when the titanyl phthalocyanine photogenerator composition is present in an amount of from about 5 percent to about 100 percent by volume. In one embodiment, this layer is of a thickness of from about 0.1 micron to about 1 micron when the photogenerator composition is present in this layer in an amount of 30 to 80 percent by volume. The maximum thickness of this layer in an embodiment is dependent primarily upon factors, such as photosensitivity, electrical properties and mechanical considerations. The charge generator layer can be obtained by dispersion coating the TiOPc obtained with the processes of the present invention, and a binder resin with a suitable solvent. The binder may be omitted. The dispersion can be prepared by mixing and/or milling the TiOPc in equipment such as paint shakers, ball mills, sand mills and attritors. Common grinding media such as glass beads, steel balls or ceramic beads may be used in this equipment. A binder resin may be selected from a wide number of polymers such as poly(vinyl butyral), poly(vinyl carbazole), polyesters, polycarbonates, poly(vinyl chloride), polyacrylates and methacrylates, copolymers of vinyl chloride and vinyl acetate, phenoxy resins, polyurethanes, poly(vinyl alcohol), polyacrylonitrile, polystyrene, and the like. The solvents to dissolve these binders depend upon the particular resin. In embodiments of the present invention, it is desirable to select solvents that do not effect the other coated layers of the device, and in addition do not cause undesirable conversions of the polymorphic form of the selected photogenerator pigment. Examples of solvents useful for coating titanyl phthalocyanines dispersions of the present invention to form a photogenerator layer are ketones, alcohols, aromatic hydrocarbons, esters, and the like. Specific examples are cyclohexanone, acetone, methyl ethyl ketone, methyl isobutyl ketone, methanol, ethanol, butanol, amyl alcohol, toluene, xylene, chlorobenzene, butyl acetate, ethyl acetate, amyl acetate, and the like.

The coating of the TiOPc dispersion in embodiments of the present invention can be accomplished with spray, dip or wire bar methods such that the final dry thickness of the charge generator layer is from 0.01 to 30 microns and preferably from 0.1 to 15 microns, and most preferably 0.1 to 1.0 micron, after being dried at 40° to 150° C. for 5 to 90 minutes.

Also, illustrative examples of polymeric binder resinous materials that can be selected for the photogenerator pigment include those polymers as disclosed in U.S. Pat. No. 3,121,006, the disclosure of which is totally incorporated herein by reference.

As adhesives, there can be selected various known substances inclusive of polyesters, polyamides, poly(vinyl butyral), poly(vinyl alcohol), polyurethane and polyacrylonitrile. This layer is of a thickness of from about 0.05 micron to 1 micron. Optionally, this layer may contain conductive and nonconductive particles such as zinc oxide, titanium dioxide, silicon nitride, carbon black, and the like to provide, for example, in embodiments of the present invention desirable electrical and optical properties.

Aryl amines selected for the charge transporting layer which generally is of a thickness of from about 5 microns to about 75 microns, and preferably of a thickness of from about 10 microns to about 40 microns, include molecules of the following formula:

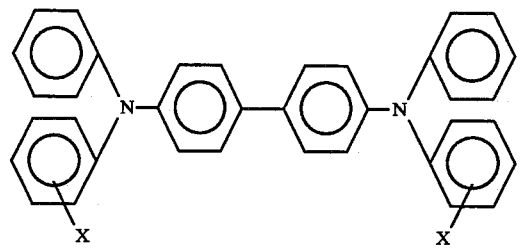

dispersed in a highly insulating and transparent organic resinous binder wherein X is an alkyl group or a halogen, especially those substituents selected from the group consisting of (ortho) $CH_3$, (meta) $CH_3$, (para) $CH_3$, (ortho) Cl, (meta) Cl, and (para) Cl.

Examples of specific aryl amines are N,N'-diphenyl-N,N'-bis(alkylphenyl)-1,1-biphenyl-4,4'-diamine wherein alkyl is selected from the group consisting of methyl, such as 2-methyl, 3-methyl and 4-methyl, ethyl, propyl, butyl, hexyl, and the like. With chloro substitution, the amine is N,N'-diphenyl-N,N'-bis(halo phenyl)-1,1'-biphenyl-4,4'-diamine wherein halo is 2-chloro, 3-chloro or 4-chloro. Other known hole transporting compounds can be selected.

Examples of the highly insulating and transparent resinous material or inactive binder resinous material for the transport layers include materials such as those described in U.S. Pat. No. 3,121,006, the disclosure of which is totally incorporated herein by reference. Specific examples of organic resinous materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binders are comprised of polycarbonate resins having a molecular weight of from about 20,000 to about 100,000 with a molecular weight of from about 50,000 to about 100,000 being particularly preferred. Generally, the resinous binder contains from about 10 to about 75 percent by weight of the active material corresponding to the foregoing formula, and preferably from about 35 percent to about 50 percent of this material.

Also, included within the scope of the present invention are methods of imaging and printing with the photoresponsive devices illustrated herein. These methods generally involve the formation of an electrostatic latent image on the imaging member, followed by developing the image with a toner composition, reference U.S. Pat. Nos. 4,560,635; 4,298,697 and 4,338,390, the disclosures of which are totally incorporated herein by reference, subsequently transferring the image to a suitable substrate, and permanently affixing the image thereto. In those environments wherein the device is to be used in a printing mode, the imaging method involves the same steps with the exception that the exposure step can be accomplished with a laser device or image bar.

The invention will now be described in detail with reference to specific preferred embodiments thereof, it being understood that these Examples are intended to be illustrative only. The invention is not intended to be limited to the materials, conditions, or process parameters recited herein, it being noted that all parts and percentages are by weight unless otherwise indicated. Comparative data and Examples are also presented.

EXAMPLE I

Figure 6:
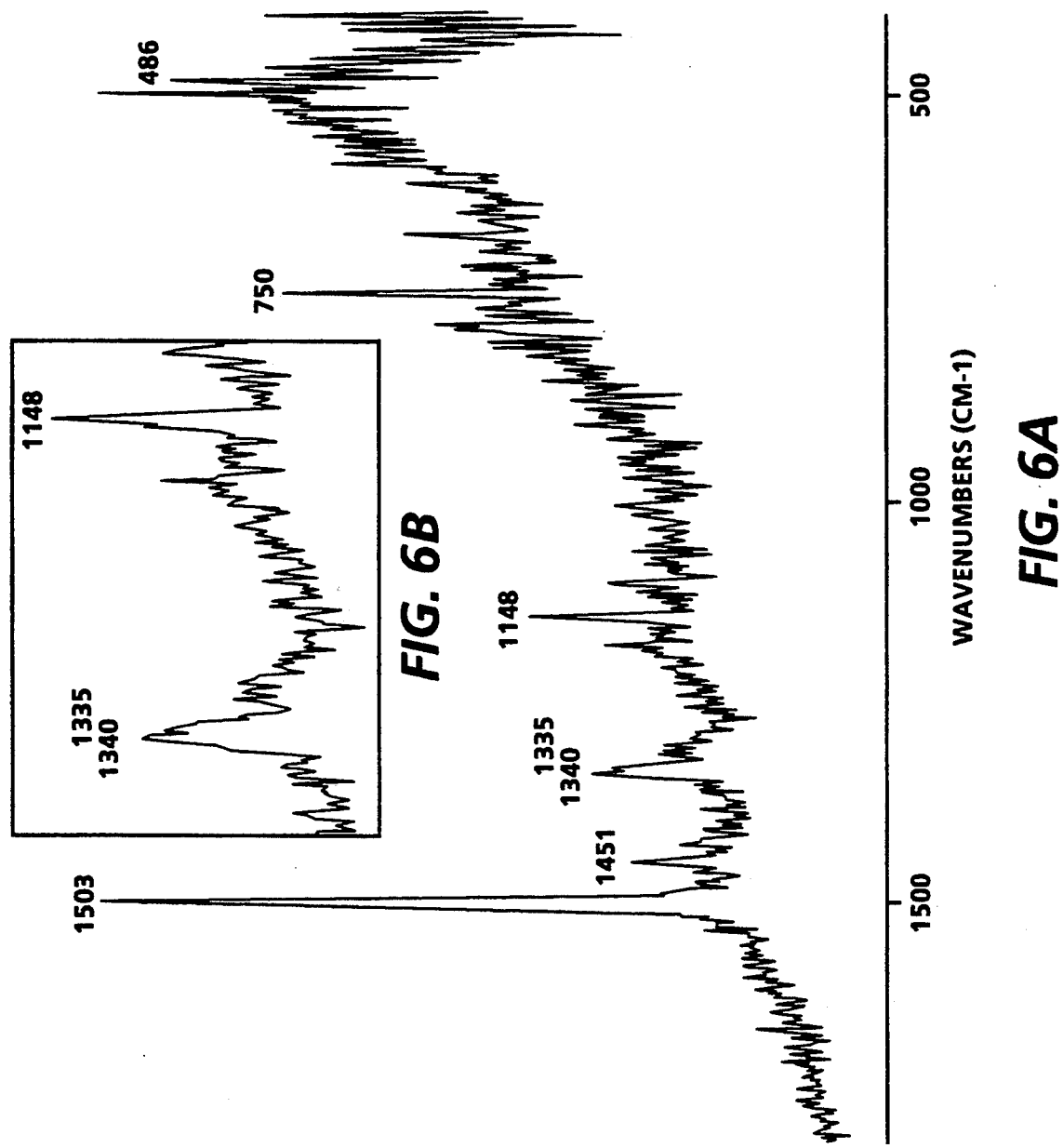
FIGS. 6A and 6B (a magnified section of 6A) illustrate the Raman spectrum of the precursor titanyl phthalocyanine Type I polymorph.
Figure 8:
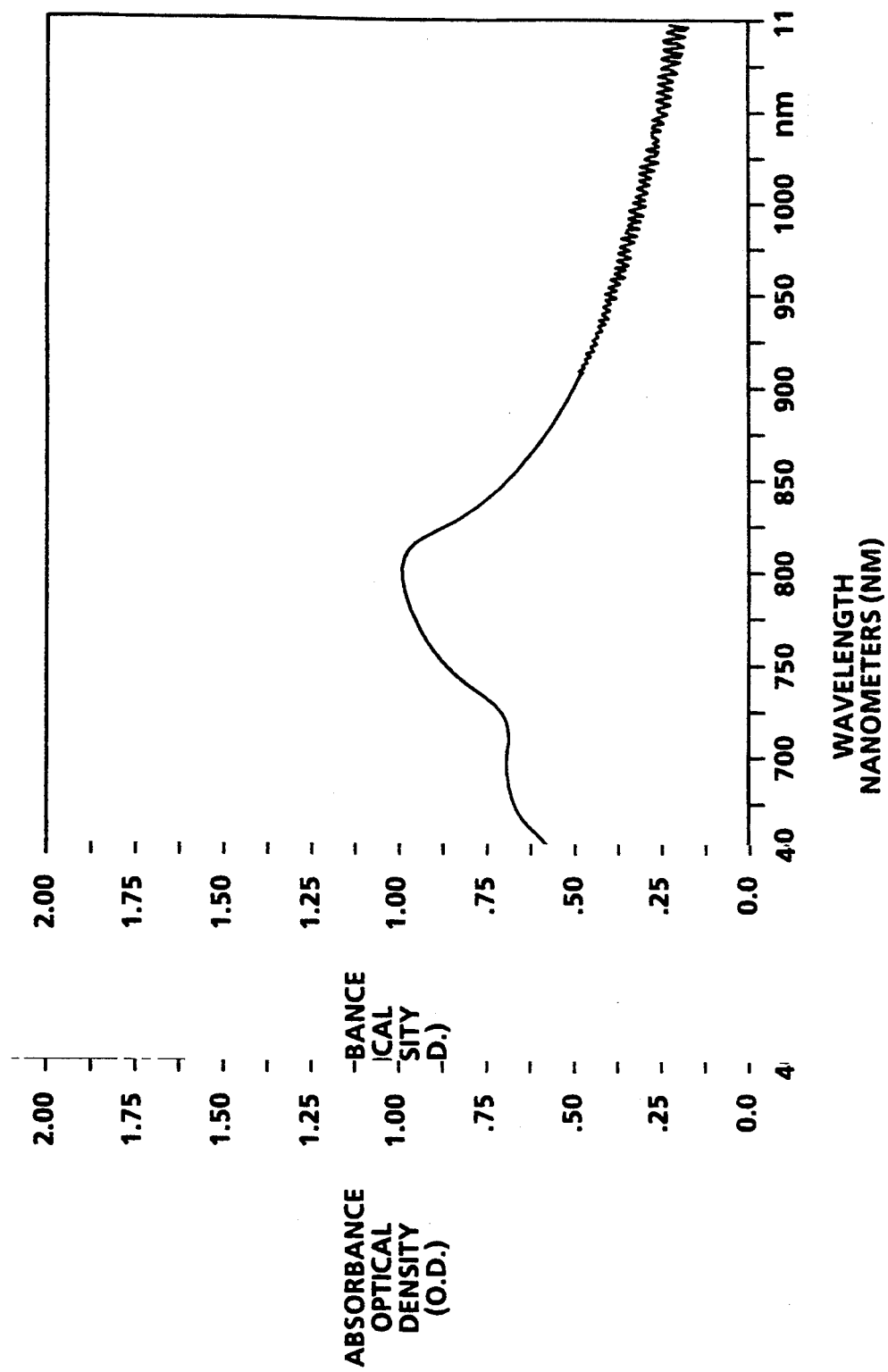
FIG. 8 illustrates the UV/visible spectrum of the precursor titanyl phthalocyanine Type I polymorph.

Synthesis of the Precursor Type I Titanyl Phthalocyanine:

A 1 liter three-necked flask fitted with mechanical stirrer, condenser and thermometer maintained under an atmosphere of argon was charged with diiminoisoindolene (94.3 grams, 0.65 mole), titanium tetrabutoxide (55.3 grams, 0.1625 mole; available from Aldrich Chemical) and 650 milliliters of 1-chloronaphthalene. The mixture was stirred and warmed. At about 140° C., the mixture turned dark green and began to reflux. At this time the condenser was removed and the vapor (this was identified as n-butanol by gas chromatography) was allowed to escape until the reflux temperature reached 230° C. The reaction was maintained at about this temperature for one and one half hours then was cooled to 150° C. Filtration using a 1 liter sintered glass funnel followed by extensive washing with boiling DMF dimethyl formamide, then methanol, provided 69.7 grams (74 percent yield) of blue pigment which was identified as the precursor Type I TiOPc by X-ray powder diffraction analysis. The Raman spectrum of this photogenerator pigment is shown in FIG. 6. The UV visible spectrum of the photogenerator pigment is shown in FIG. 8.

The elemental analysis of the above obtained pigment was: C, 67.38; H, 2.78; N, 19.10; Ash, 13.61. TiOPc requires: C, 66.67; H, 2.80; N, 19.44; Ash, 13.86.

The above precursor titanyl phthalocyanine Type I was evaluated as a photogenerator pigment in duplicate xerographic imaging devices similar to the Xerox Corporation 5090, which were prepared by the following procedure. An aluminized MYLAR ® substrate (3 mil) was coated with a solution containing zirconium oxide precursor and silane prepared by dissolving 6.5 grams of ZC540 [$(C_5H_7O_2)Zr(OC_4H_9)_3$] and 0.75 gram of A1110 [$(NH_2C_3H_6)Si(OCH_3)_3$] in 14.25 grams of n-butanol and 28.5 grams of isopropanol, using a wire wound rod applicator. This layer was dried at 138° C. for 10 minutes; the final thickness was measured to be 0.1 micron. A dispersion of the TiOPc was prepared in a paint shaker device by milling 0.56 gram of the precursor Type I TiOPc polymorph of this Example, and 20 grams of 1.3 percent poly(vinyl butyral) in butyl acetate in a 60 milliliter jar containing 70 grams of glass beads (1 millimeter diameter). The dispersion was milled for 2 hours, then was coated onto the $Zr_2O_3$ layer described above using a wire wound rod applicator. The thus formed photogenerating layer was dried at 100° C. for 10 minutes; its final thickness was determined to be about 0.20 micron. Hole transporting layer solutions were prepared by dissolving 5.4 grams of N,N'-diphenyl-N,N-bis(3-methyl phenyl)-1,1'-biphenyl-4,4'-diamine, and 8.1 grams of polycarbonate in 57.6 grams of chlorobenzene. The solution was coated onto the TiOPc generator layer using a 10 mil film applicator. The charge transporting layer thus obtained was dried at 115° C. for 60 minutes to provide a final thickness of about 28 microns.

The xerographic electrical properties of the photoresponsive imaging members were determined, in duplicate experiments, by electrostatically charging the surface thereof with a corona discharge source until the surface potential as measured by a capacitatively coupled probe attached to an electrometer attained an initial dark value, $V_0$, of about $-800$ volts. After resting for 0.5 second in the dark, the charged member reached a surface potential, $V_{ddp}$, or dark development potential. The member was then exposed to monochromatic light (780 nanometers) from a Xenon lamp equipped with neutral density filters. A reduction in surface potential from $V_{ddp}$ to a background potential, $V_{bg}$, due to the photodischarge effect was observed. The dark decay in volts per second was calculated as $(V_0-V_{ddp})/0.5$. The percent of photodischarge was calculated as $100\times(V_{ddp}-V_{bg})/V_{ddp}$. The half-exposure energy, $E_{\frac{1}{2}}$, the required exposure energy causing reduction of the $V_{ddp}$ to half of its initial value, was determined. Xerographic electrical characteristics of the photogenerator pigment prepared in this Example are shown in Table 1 (Sample #24960-35).

EXAMPLE II

Figure 3:
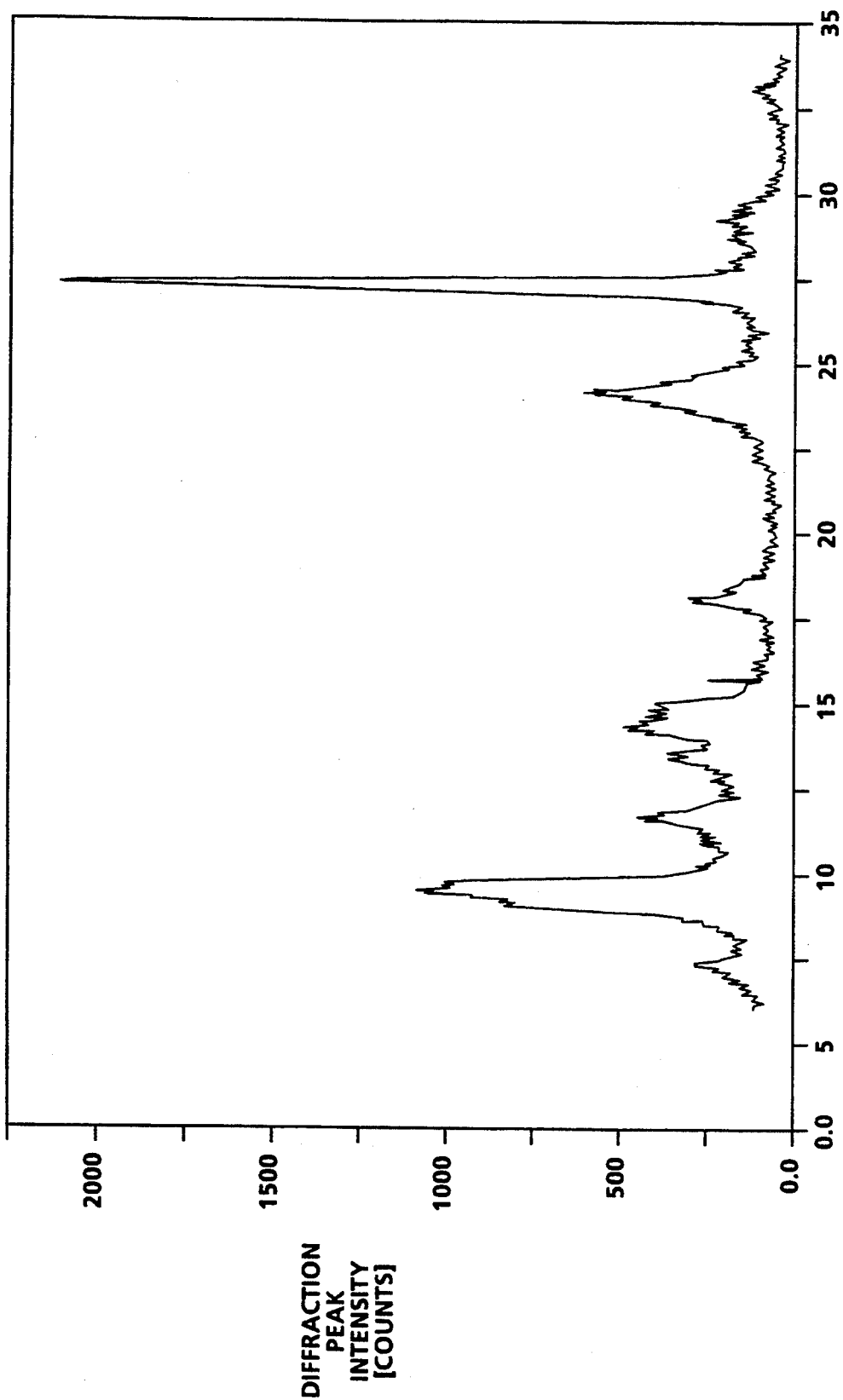
FIG. 3 illustrates the X-ray powder diffraction pattern of the Type IV polymorph of titanyl phthalocyanine.
Figure 4:
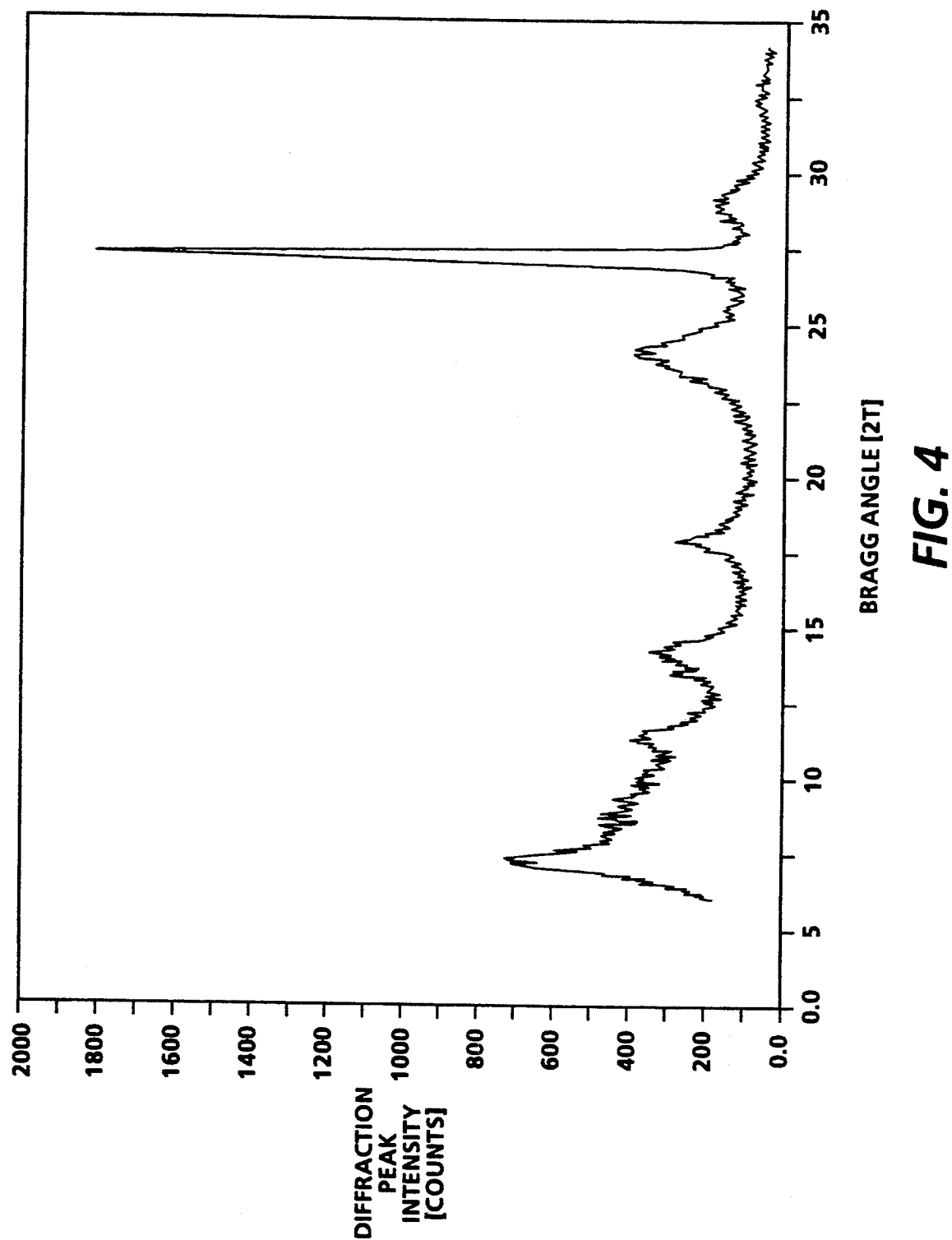
FIG. 4 illustrates the X-ray powder diffraction pattern of Type X polymorph of titanyl phthalocyanine.

Preparation of Type IV Titanyl Phthalocyanine:

To a solution of trifluoroacetic acid (1 liter) in methylene chloride (4 liters), stirred with a magnet in a 10 liter Erlenmeyer flask was added 500 grams of precursor Type I TiOPc, synthesized as in Example I, over a 5 minute period. No heat was evolved, and the resultant dark green solution, which contained no undissolved material, was stirred at room temperature for about 15 minutes. The solution was poured over a 1 hour period into a solution of methanol (25 liters) and water (25 liters) contained in a 100 liter plastic vessel, which was stirred mechanically at a controlled temperature of <10° C. at a rate which was sufficient to create a vortex, which extended almost to the bottom of the vessel. Following the addition, the resultant blue suspension was stirred at room temperature for 1 hour, then was allowed to stand undisturbed for 25 minutes. The yellowish brown supernatant liquid was almost completely separated from the precipitated solid by carefully decanting the liquid from the reaction vessel. The remaining blue residue was redispersed in 25 liters of methanol by stirring mechanically for 1 hour at room temperature (about 25° C. throughout). The resultant suspension was filtered through a glass fiber filter in a porcelain filter funnel, and then washed repeatedly in the filter funnel with a total of about 90 liters of hot (>90° C.) deionized water until the conductivity of the filtrate, measured with a laboratory cell fixture with electrodes, was less than 20 µS. The product Type X phthalocyanine was identified by X-ray powder diffraction analysis (FIG. 4), and then redispersed in 25 liters of chlorobenzene by stirring for 1 hour using a mechanical stirrer. The solution was then filtered as illustrated herein, and dried at 75° C. overnight (18 hours) to provide 463 grams (94 percent yield) of dark blue pigment which was identified as Type IV TiOPc by its characteristic X-ray powder diffraction pattern (FIG. 3).

Xerographic evaluation of this pigment as a photogenerator was accomplished with the electrophotographic device configuration described in Example I, replacing the Type I precursor pigment with the Type IV polymorph of titanyl phthalocyanine prepared in this Example II. Xerographic electrical characteristics of the photogenerator pigment in the layered electrophotographic device are shown in Table 1 (Sample #24960-80).

EXAMPLE III

Figure 1:
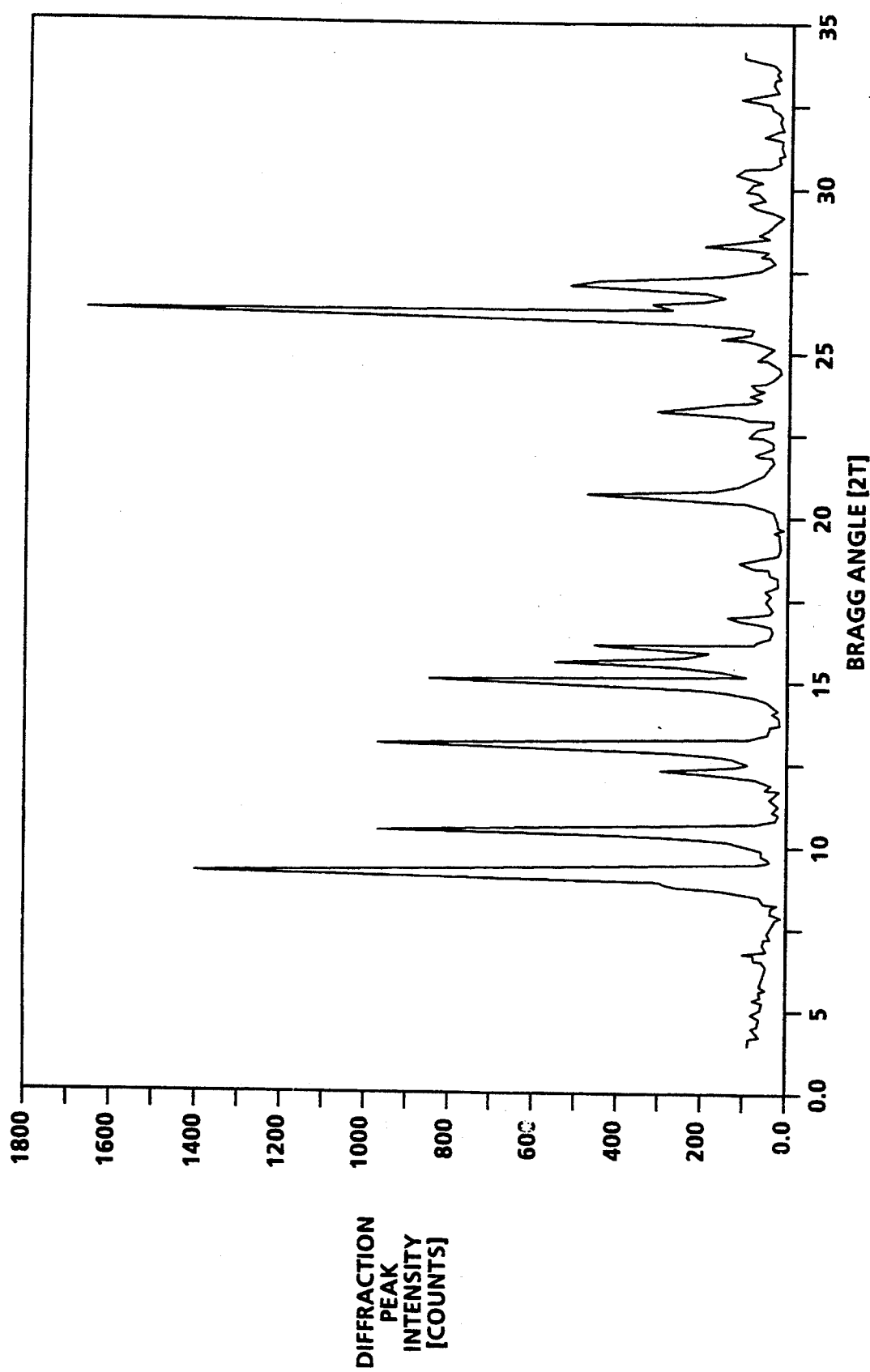
FIG. 1 illustrates the X-ray powder diffraction pattern of the titanyl phthalocyanine Type I polymorph with the more perfect crystalline structure obtained with the processes of the present invention.
Figure 5:
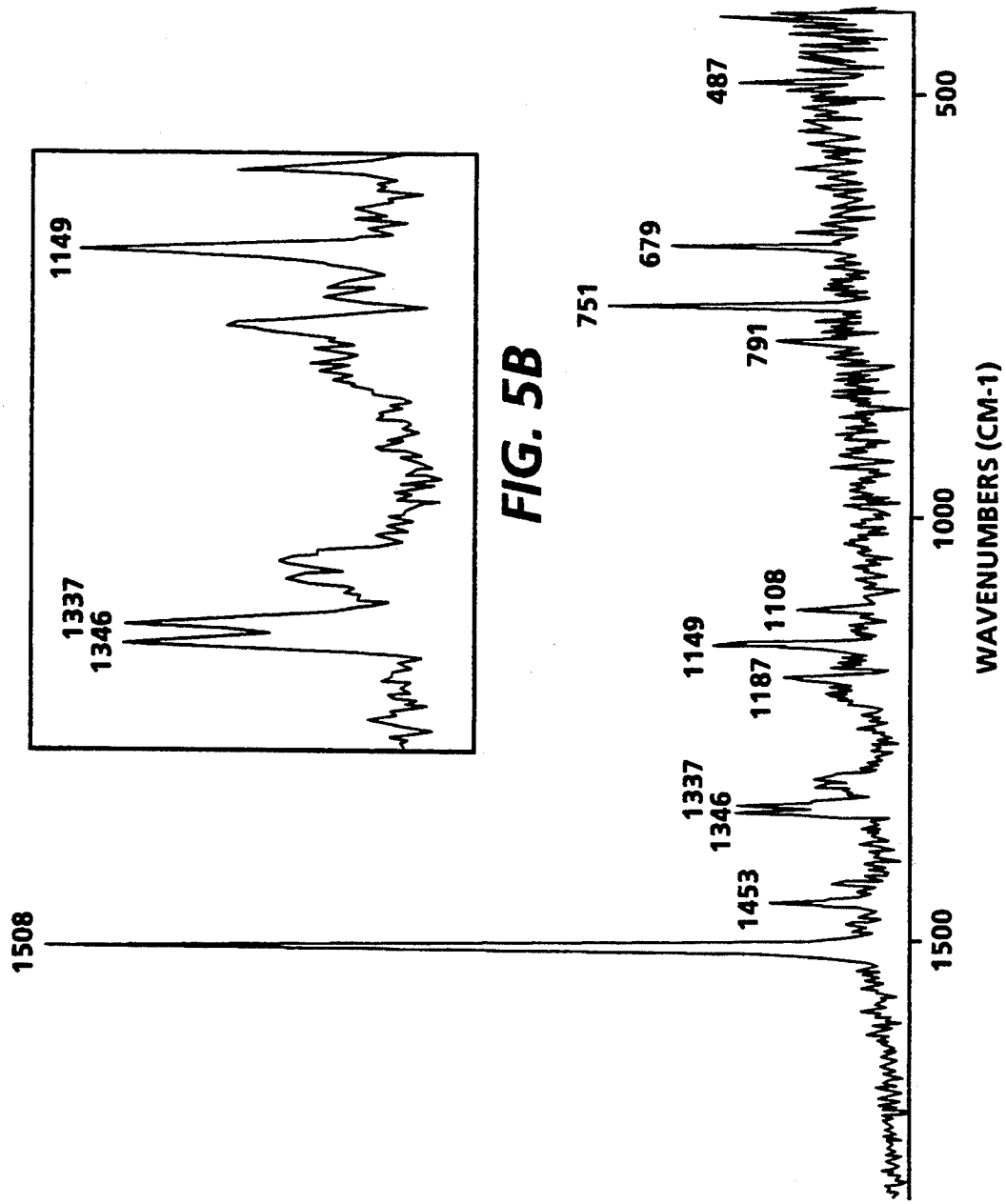
FIGS. 5A and 5B (a magnified section of 5A) illustrate the Raman spectrum of the titanyl phthalocyanine Type I polymorph with the more perfect crystalline structure obtained with the processes of the present invention.

Preparation of the More Perfect Crystalline Type I Polymorph of Titanyl Phthalocyanine by Stirring:

Into a 4 liter Erlenmeyer flask contained in a temperature controlled cooling/heating bath were added 100 grams of Type IV titanyl phthalocyanine prepared by the process of Example II, which had been gently ground into a fine powder. To this powder were added 2 liters of dichloromethane, and the mixture was stirred at 24° C. for 50 hours. Over the course of this period, small samples were taken for analysis by X-ray powder diffraction in order to determine the degree of polymorphic conversion of the Type IV polymorph to the more thermodynamically stable Type I polymorph. After 50 hours, it was determined that all the Type IV polymorph had been converted to the more perfect crystalline form of the Type I titanyl phthalocyanine (FIGS. 1 and 5). The solid material was recovered from the dichloromethane slurry by filtration through a glass fiber filter paper (yield=97.45 grams; 97 percent).

Xerographic evaluation of this pigment as a photogenerator was accomplished with the electrophotographic device configuration described in Example I, replacing the Type I precursor pigment with the more perfect crystalline Type I polymorph prepared in this Example III. Xerographic electrical characteristics of the photogenerator pigment in the layered electrophotographic device are shown in Table 1 (Sample #25724-73).

EXAMPLE IV

Preparation of the More Perfect Crystalline Type I Titanyl Phthalocyanine by Milling:

Into a 250 milliliter glass bottle were added 5 grams of finely ground Type IV titanyl phthalocyanine prepared by the process of Example II. To this powder were added 100 milliliters of dichloromethane, and 800 grams of ⅛ inch stainless steel balls. The sealed bottle was ball milled at an external temperature of 24° C. at approximately 250 RPM for 3 hours, during which time several small samples were extracted by filtration through a glass microfiber filter for X-ray powder diffraction analysis. After 3 hours, it was determined that all the Type IV polymorph had been converted to the more perfect crystalline form of the Type I titanyl phthalocyanine (FIGS. 1 and 5). The solid material was recovered from the dichloromethane slurry by filtration through a glass fiber filter paper (yield=4.5 grams; 90 percent). Xerographic evaluation of this pigment as a photogenerator was accomplished with the electrophotographic device configuration described in Example I, replacing the Type I precursor pigment with the more perfect crystalline Type I polymorph prepared in this Example IV. Xerographic electrical characteristics of the photogenerator pigment in the layered electrophotographic device are shown in Table 1 (Sample #25724-62-A).

TABLE 1

| SAMPLE I.D. | Treatment Conditions in $CH_2Cl_2$ | Dark Decay (V/s) | % Discharge (780 nm) @ (ergs/cm$^2$) 5 | % Discharge (780 nm) @ (ergs/cm$^2$) 10 | $E_{\frac{1}{2}}$ (ergs/cm$^2$ at 780 nm) | Initial Sensitivity SV. erg$^{-1}$ cm$^2$ | $V_{ddp}$ (volt) | Cycle Down of $V_{ddp}$ 50,000 Cycles |
|---|---|---|---|---|---|---|---|---|
| 25724-73 Type I TiOPc with more perfect crystal structure from Example III | 100 grams /2 liters $CH_2Cl_2$ stirred for 50 hours | 9 / 7 | 79 / 78 | 90 / 89 | 2.1 / 2.2 | 210 / 205 | −802 / −802 | 3% / 3% |
| 25724-62-A Type I TiOPc with more perfect crystal structure from Example IV | 5 grams /100 mL $CH_2Cl_2$ milled for 3 hours | 7 / 7 | 75 / 72 | 88 / 88 | 2.5 / 2.7 | 200 / 200 | −811 / −806 | 5% / 5% |
| 24960-35 Precursor Type I TiOPc polymorph from Example I | None | 159 / 155 | 53 / 49 | 70 / 66 | 5.4 / 5.7 | 90 / 92 | −493 / −502 | 28% / 39% |
| 24960-80 Type IV TiOPc polymorph from Example II | None | 4 / 6 | 88 / 89 | 90 / 91 | 0.7 / 0.7 | 430 / 425 | −813 / −833 | 10% / 10% |
| Commercial photoreceptor based on Type I TiOPc | None | 27 | 53 | 81 | 4.7 | 125 | −800 | 10% |

Comparison of Xerographic Performance:

From a consideration of the xerographic electrical parameters shown in Table 1, it is evident that the electrophotographic devices fabricated from the samples of Type I titanyl phthalocyanine having the more perfect crystalline structure (Examples III and IV) exhibit a much lower dark decay of 7 to 9 volts/second when compared to the precursor Type I titanyl phthalocyanine (Example I), which exhibits greatly inferior dark decay characteristics (150 to 160 volts/second). In addition, the more perfect crystalline form of the Type I titanyl phthalocyanine exhibits higher initial discharge photosensitivity to incident light at 780 nanometers (S value; 200 to 210 volts erg$^{-1}$ cm$^2$) when compared to the precursor Type I titanyl phthalocyanine, which exhibits a much lower value (S value; 90 to 92 volts erg$^{-1}$ cm$^2$). The more perfect crystalline form of the Type I titanyl phthalocyanine also exhibits better overall discharge characteristics to incident light of 780 nanometers ($E_{\frac{1}{2}}$=2.1 to 2.7 ergs/cm$^2$), when compared to the precursor Type I titanyl phthalocyanine, which exhibits $E_{\frac{1}{2}}$=5.4 to 5.7 ergs/cm$^2$. Moreover, the more perfect crystalline form of the Type I titanyl phthalocyanine also exhibits more stable xerographic cycling characteristics (3 to 5 percent cycle down of $V_{ddp}$ after 50,000 cycles), when compared to the precursor Type I titanyl phthalocyanine, which exhibits a much higher value of cycle down of the $V_{ddp}$ (20 to 40 percent) after 50,000 cycles.

From a review of the xerographic electrical parameters shown in Table 1, it is also evident that the electrophotographic devices fabricated from the samples of Type I titanyl phthalocyanine having the more perfect crystalline structure (Examples III and IV) exhibit a much lower dark decay of 7 to 9 volts/second, much higher photosensitivity at 780 nanometers (S value; 200 to 210 volts erg$^{-1}$ cm$^2$ and $E_{\frac{1}{2}}$=2.1 to 2.7 ergs/cm$^2$), and more stable xerographic cycling (3 to 5 percent cycle down of $V_{ddp}$ after 50,000 cycles), when compared to an electrophotographic device of the prior art, as described, for example, in U.S. Pat. No. 4,664,997. This prior art electrophotographic device, when subjected to a xerographic evaluation procedure identical to that of the electrophotographic devices fabricated from the samples of Type I titanyl phthalocyanine having the more perfect crystalline structure of the present invention, exhibited a dark decay of 27 volt/second; an initial discharge S value of 125 volt erg$^{-1}$ cm$^2$; an $E_{\frac{1}{2}}$=4.7 ergs/cm$^2$; and 10 percent cycle down of $V_{ddp}$ after 50,000 cycles.

X-ray Powder Diffraction (XRPD):

X-ray powder diffraction patterns were collected for each pigment on a Philips model 1710 X-ray powder diffraction system equipped with a graphite monochromator and pulse-height analyzer. X-rays of the CuKα wavelength (0.15418 nanometer) produced by a conventional Philips X-ray generator model 1730 were used. Typical tube current and voltage settings were 40 mA and 40 KV, respectively. Scans were run from 4 to 34 degrees (two-theta) and collected stepwise with a 0.1 degree step size and a counting time of 10 seconds at each step.

Figure 2:
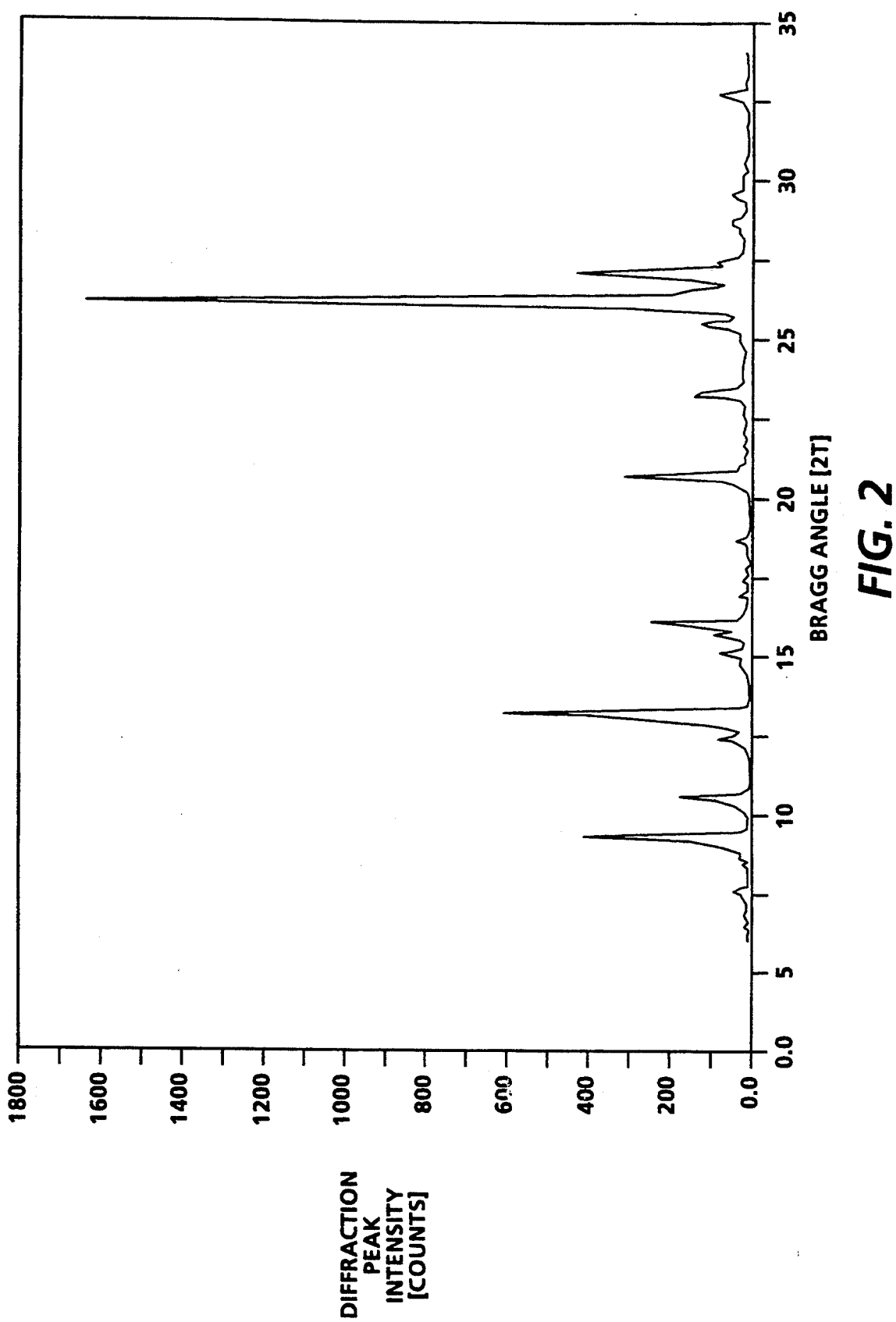
FIG. 2 illustrates the X-ray powder diffraction pattern of the precursor titanyl phthalocyanine Type I polymorph.

The X-ray powder diffraction patterns of the Type I TiOPc having the more perfect crystalline structure from both Example III and Example IV are substantially identical and are shown in FIG. 1. The X-ray powder diffraction patterns of the precursor Type I TiOPc from Example I is shown in FIG. 2. Both FIGS. 1 and 2 are characterized by peaks in the X-ray powder diffraction pattern at Bragg angle (2Θ) 6.8°±0.2°; 9.2°±0.2°; 10.4°±0.2°; 12.3°±0.2°; 13.1°±0.2°; 15.0°±0.2°; 15.6°±0.2°; 16.0°±0.2°; 20.6°±0.2°; 23.2°±0.2°; 25.3°±0.2°; 26.2°±0.2°; 26.5°±0.2°; and 27.1°±0.2°. However, the more perfect crystal form of the Type I polymorph (FIG. 1) has a peak at a Bragg angle (2Θ) of 6.8° (±0.2°); a peak at 9.2° (±0.2°), which is of intensity at least 80 percent relative to the major peak in the trace at 26.2°; a peak at 10.4° (±0.2°), which is of intensity of at least 50 percent relative to the major peak in the trace at 26.2° (2Θ); a peak at 13.1° (±0.2°), which is of intensity at least 60 percent relative to the major peak in the trace at 26.2°; a peak at 15.0° (±0.2°), which is of intensity at least 40 percent relative to the major peak in the trace at 26.2°; a peak at 15.6° (±0.2°), which is of intensity at least 25 percent relative to the major peak in the trace at 26.2°; a peak at 16.0° (±0.2°), which is of intensity at least 25 percent relative to the major peak in the trace at 26.2°; a peak at 20.6° (±0.2°), which is of intensity at least 25 percent relative to the major peak in the trace at 26.2°; a resolved peak at 26.5° (±0.2°), which is of intensity at least 10 percent relative to the major peak in the trace at 26.2°; and a peak at 27.1° (±0.2°), which is of intensity at least 20 percent relative to the major peak in the trace at 26.2°. This contrasts strongly with the X-ray powder diffraction patterns of the precursor Type I TiOPc from Example I, shown in FIG. 2, where the peaks at lower values of Bragg angle are significantly lower in intensity, relative to the peak at 26.2°. We conclude on this basis that the polymorph of Type I TiOPc from Examples III and IV have significantly less inherent defects in the crystal structure, or a more perfect crystalline structure compared to the precursor Type I TiOPc from Example I.

FT-Raman Spectroscopy:

The following TiOPc solid pigments were enclosed in Aldrich melting point capillary tubes. A Bomem Ramspec 150 spectrophotometer with a Nd:YAG laser emitting at 1,064 nanometers with InGaAs detector was used to acquire the FT-Raman spectra. The system is equipped with a Michelson interferometer and was interfaced to a NEC Powermate 286 Plus computer. Bomem Easy (version 1.45) software was used to collect the data and files were imported to Spectra Calc available from Galactic Industries Corporation. All Raman files were ratioed against an instrument response curve. A backscattering geometry was used with the resolution set at 2 cm$^{-1}$ and 100 scans were averaged.

The Raman spectra of the Type I TiOPc having the more perfect crystalline structure from both Example III and Example IV are identical and are shown in FIG. 5. The Raman spectrum of the precursor Type I TiOPc from Example I is shown in FIG. 6. The most intense peak in the Raman spectrum, due to the C—N stretch of the pyrrole ring in the TiOPc structure, is depicted in FIG. 5, and appears at 1,508 cm$^{-1}$, whereas this most intense peak in the Raman spectrum depicted in FIG. 6 appears at 1,503 cm$^{-1}$. In FIGS. 5 and 6, there is also a Daydov splitting (correlation field splitting) of a band at 1,337 cm$^{-1}$ and 1,346 cm$^{-1}$, which is more pronounced in FIG. 5, when compared to FIG. 6. The bands in this region of the Raman spectrum are assigned to the stretching of the $C_\alpha$-$C_\beta$ in the pyrrole ring structure. The conclusion is that this difference in splitting is indicative of differences in the overlap of adjacent TiOPc molecules in the crystal structure. The polymorph of Type I TiOPc of Examples III and IV have significantly less inherent defects in the crystal structure, or a more perfect crystalline structure compared to the precursor Type I TiOPc of Example I.

Figure 7:
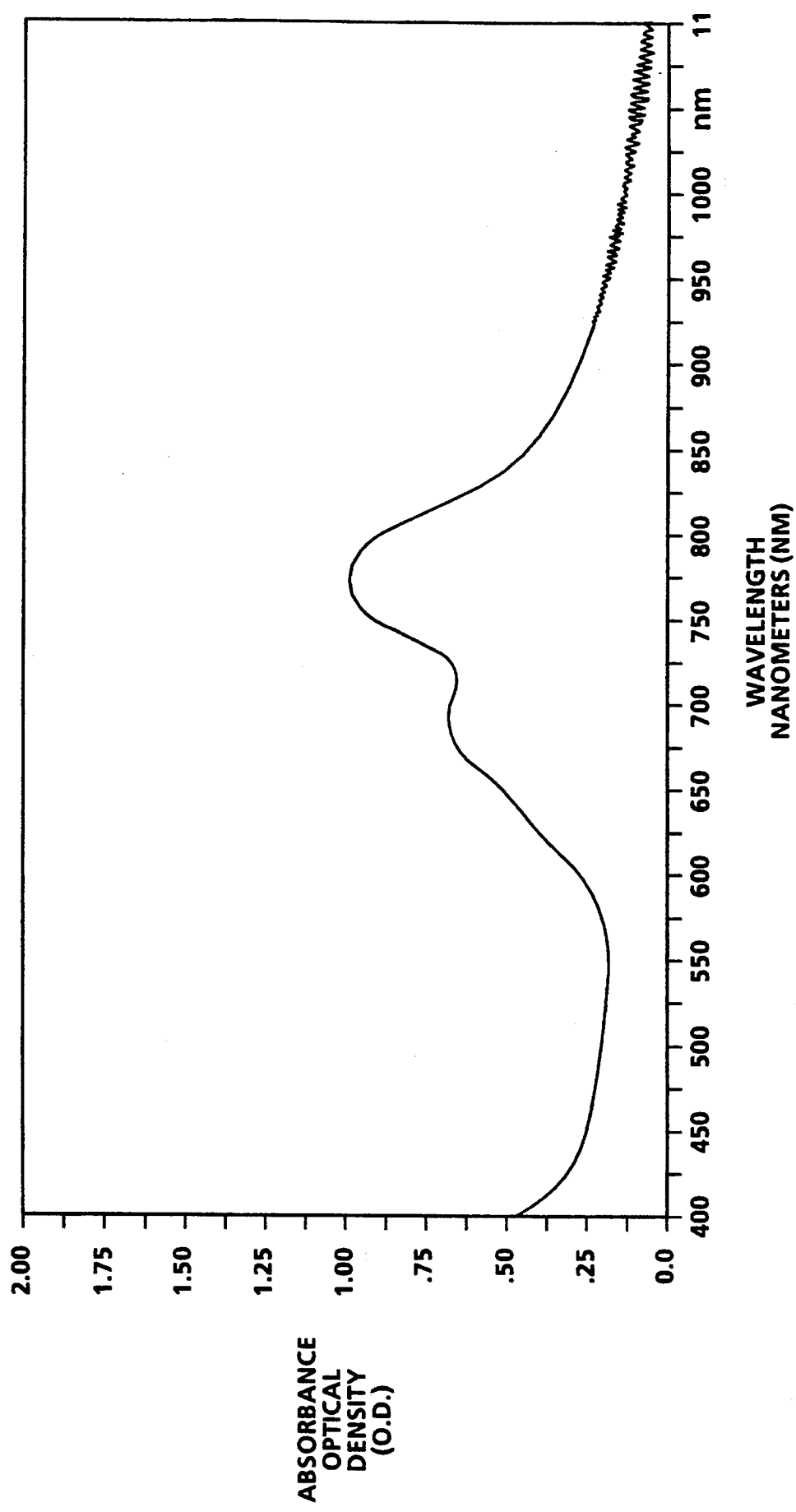
FIG. 7 illustrates the UV/visible spectrum of the titanyl phthalocyanine Type I polymorph with the more perfect crystalline structure obtained with the processes of the present invention.

UV-Visible Spectra:

There are clear differences between the solid state UV-Visible spectra of the Type I TiOPc pigments from Example III (FIG. 7) and Example I (FIG. 8) when they are finely dispersed in a poly(vinylbutyral) matrix. The $\lambda_{max}$ of the pigment from Example III appears at 780 nanometers while the $\lambda_{max}$ of the pigment from Example I appears at 800 nanometers. The splitting of the allowed electronic transition in both cases is attributed to the formation of dimers due to strong intermolecular interactions, but is narrower for the more perfect crystalline polymorph of Type I TiOPc when compared to the precursor Type I TiOPc.

Other modifications of the present invention may occur to those skilled in the art subsequent to a review of the present application. The aforementioned modifications, including equivalents thereof, are intended to be included within the scope of the present invention.

What is claimed is:

1. A process for the preparation of a more perfect crystalline form of the Type I polymorph of titanyl phthalocyanine consisting essentially of dissolving a precursor titanyl phthalocyanine Type I in a solution of trihaloacetic acid and alkylene chloride; adding the resultant solution to a solvent thereby enabling precipitation of Type X titanyl phthalocyanine; separating the titanyl phthalocyanine Type X from the solution; followed by a first washing with an organic solvent and a second washing with water; slurrying the resulting Type X titanyl phthalocyanine in an organic solvent enabling conversion of said Type X to Type IV titanyl phthalocyanine; and thereafter, subjecting the Type IV titanyl phthalocyanine obtained to treatment with an organic solvent to enable said crystalline form of titanyl phthalocyanine Type I; and wherein said crystalline form of titanyl phthalocyanine possesses Bragg angles (2Θ) at 6.8, 9.2, 10.4, 12.3, 13.1, 15.0, 15.6, 16.0, 20.6, 23.2, 25.3, 26.2, 26.5, and 27.1° (±0.2°).

2. A process in accordance with claim 1 wherein said Type X polymorph is slurried at about 25° C. in from about 10 volume parts to about 100 volume parts of chlorobenzene for a period of from about 1 minute to about 120 minutes.

3. A process in accordance with claim 1 wherein the precursor titanyl phthalocyanine is dissolved in a mixture of trifluoroacetic acid and methylene chloride.

4. A process in accordance with claim 1 wherein the precursor titanyl phthalocyanine is dissolved in a 1:4 mixture of trifluoroacetic acid and methylene chloride.

5. A process in accordance with claim 1 wherein the solvent for precipitation is comprised of methanol and water.

6. A process in accordance with claim 1 wherein the precipitant solution is comprised of methanol and water in a ratio of from about 60 percent of methanol and 40 percent of water to about 35 percent of methanol and about 65 percent of water.

7. A process in accordance with claim 1 wherein the first washing is accomplished with methanol or acetone.

8. A process in accordance with claim 1 wherein the organic solvent selected to enable the conversion the Type X pigment to the Type IV pigment is chlorobenzene present in an amount of from about 10 volume parts to about 100 volume parts for each part by weight of titanyl phthalocyanine dispersed.

9. A process in accordance with claim 1 wherein the organic solvent treatment is accomplished by forming a slurry of the Type IV titanyl phthalocyanine in methylene chloride.

10. A process in accordance with claim 1 wherein the organic treatment solvent selected for the Type IV titanyl phthalocyanine is methylene chloride, and the conversion thereof to the more perfect crystalline form of Type I titanyl phthalocyanine is effected by stirring or ball milling at room temperature of between about 22° and 25° C.

11. A process in accordance with claim 1 wherein the organic treatment solvent selected for the Type IV titanyl phthalocyanine is methylene chloride, and the conversion thereof to the more perfect crystalline form of Type I is effected by stirring at room temperature, between about 22° and 25° C., for a period of from between about 24 hours to about 7 days.

12. A process in accordance with claim 11 wherein stirring is effected for from between about 40 hours to about 72 hours.

13. A process for the preparation of titanyl phthalocyanine Type I with Bragg angles (2Θ) at 6.8, 9.2, 10.4, 12.3, 13.1, 15.0, 15.6, 16.0, 20.6, 23.2, 25.3, 26.2, 26.5, and 27.1° (±0.2°) consisting essentially of the reaction of a titanium alkoxide with diiminoisoindoline in a solvent of chloronaphthalene; dissolving the obtained precursor Type I titanyl phthalocyanine in a solvent comprised of trifluoroacetic acid and methylene chloride; reprecipitating the dissolved pigment by addition to a methanol and water; subsequently washing the Type X titanyl phthalocyanine obtained with first methanol, then water; converting the Type X to Type IV by slurrying the Type X in monochlorobenzene; forming a slurry of the formed Type IV in methylene chloride; and isolating the said Type I titanyl phthalocyanine.

14. A process in accordance with claim 13 wherein said titanyl Type I polymorph obtained possesses the X-ray powder diffraction pattern of FIG. 1.

15. A process in accordance with claim 13 wherein the X-ray diffraction pattern of the more perfect crystalline form of the Type I titanyl phthalocyanine polymorph, has a peak at a Bragg angle (2Θ) of 6.8° (±0.2°), which is of an intensity of at least 2 percent relative to the major peak in the trace at 26.2°; a peak at 9.2° (±0.2°), having an intensity of at least 80 percent relative to the major peak in the trace at 26.2°; a peak at 10.4° (±0.2°), which is of an intensity of at least 50 percent relative to the major peak in the trace at 26.2° 2Θ; a peak at 13.1° (±0.2°), which is of an intensity at least 60 percent relative to the major peak in the trace at 26.2°; a peak at 15.0° (±0.2°), which is of an intensity of at least 40 percent relative to the major peak in the trace at 26.2°; a peak at 15.6° (±0.2°), which is of an intensity at least 25 percent relative to the major peak in the trace at 26.2°; a peak at 16.0° (±0.2°), which is of an intensity at least 25 percent relative to the major peak in the trace at 26.2°; a peak at 20.6° (±0.2°), which is of an intensity at least 25 percent relative to the major peak in the trace at 26.2°; a resolved peak at 26.5° (±0.2°), which is of an intensity at least 10 percent relative to the major peak in the trace at 26.2°; and a peak at 27.1° (±0.2°), which is of an intensity at least 20 percent relative to the major peak in the trace at 26.2°.

16. A process in accordance with claim 15 wherein the X-ray diffraction pattern for the more perfect crystal form of the Type I polymorph has peaks at Bragg angles (2Θ) of 15.6 and 16.0° having approximately equal intensities, not more than 80 percent of the intensity of the peak at 15.0°.

17. A process in accordance with claim 15 wherein the X-ray diffraction pattern for the more perfect crystal form of the Type I polymorph has a peak at Bragg angle (2Θ) 6.8°, which has a relative intensity of at least 2 percent relative to the major peak in the trace at 26.2°, but has no peak at 7.5°.

18. A process in accordance with claim 15 wherein said more perfect crystalline form of Type I titanyl phthalocyanine possesses the UV absorportion spectrum of FIG. 7.

19. A process in accordance with claim 15 wherein the UV absorption spectrum for the more perfect crystal form of the Type I polymorph obtained has a $\lambda_{max}=780$ nanometers.

20. A process in accordance with claim 15 wherein said more perfect crystalline form of Type I titanyl phthalocyanine possesses an FT-Raman spectrum of FIG. 5A.

21. A process in accordance with claim 13 wherein the FT-Raman spectrum for the Type I polymorph obtained has an absorption band with maximum intensity at 1,508 cm$^{-1}$.

22. A process in accordance with claim 13 wherein the second solvent is methanol, acetone or water.

23. A process in accordance with claim 22 wherein the second solvent of methanol, acetone or water comprises from about 10 volume parts to about 100 volume parts, from about 30 volume parts to about 70 volume parts, or from about 50 volume parts per each weight part of titanyl phthalocyanine pigment.

24. A process in accordance with claim 1 wherein said crystalline form of the Type I titanyl phthalocyanine product is characterized by peaks in the X-ray powder diffraction spectrum at Bragg angle (2Θ)6.8°±0.2°; 9.2°±0.2°; 10.4°±0.2°; 12.3°±0.2°; 13.1°±0.2°; 15.0°±0.2°; 15.6°±0.2°; 16.0°±0.2°; 20.6°±0.2°; 23.2°±0.2°; 25.3°±0.2°; 26.2°±0.2°; 26.5°±0.2°; and 27.1°±0.2°.

25. A process in accordance with claim 1 wherein said organic solvent to enable said crystalline form of titanyl phthalocyanine Type I is dichloromethane.

26. A process for the preparation of more perfect crystalline form of the Type I polymorph of titanyl phthalocyanine consisting essentially of (1) dissolving the precursor pigment, Type I titanyl phthalocyanine, in a mixture of trifluoroacetic acid and methylene chloride with from 5 percent of acid to about 25 percent of acid and 95 parts to 75 parts of methylene chloride, and wherein the amount of precursor pigment is from about 5 parts to about 25 parts, stirring the resulting mixture for a period of time, for example from about 5 minutes to about 24 hours at a temperature of from about 0° to about 50° C.; (2) pouring or adding the resultant solution into a rapidly stirred precipitant solvent in a ratio of from about 1 part of the pigment solution of (1) to 2 parts of precipitant solvent to about 1 part of the pigment solution to about 50 parts of solvent at a temperature of from about 0° to about 100° C. over a period of from 1 minute to about 60 minutes; (3) stirring the resulting dispersion containing Type X titanyl phthalocyanine at a temperature of from 0° to about 100° C. for a period of from about 5 minutes to about 24 hours; (4) subsequently separating the titanyl phthalocyanine Type X; (5) redispersing the resulting Type X in a solvent of methanol, acetone, water, or mixtures thereof from about 20 parts to about 100 parts of solvent to 1 part of Type X for a period of from about 5 minutes to 24 hours at a temperature of from 0° C. to about 100° C.; (6) isolating titanyl phthalocyanine Type X; (7) contacting the Type X obtained with chlorobenzene to form Type IV titanyl phthalocyanine; and (8) subsequently slurrying the Type IV obtained with dichloromethane or methylene chloride.

27. A process in accordance with claim 1 wherein the said Type IV titanyl phthalocyanine is slurried in said organic solvent of dichloromethane or tetrahydrofuran.

* * * * *